(12) United States Patent
Wexler

(10) Patent No.: US 11,866,989 B2
(45) Date of Patent: Jan. 9, 2024

(54) FRAMELESS SUPPLEMENTAL WINDOW FOR FENESTRATION

(71) Applicant: WexEnergy LLC

(72) Inventor: Ronald M. Wexler, Rochester, NY (US)

(73) Assignee: WEXENERGY LLC, Rochester, NY (US)

( * ) Notice: Subject to any disclaimer, the term of this patent is extended or adjusted under 35 U.S.C. 154(b) by 0 days.

(21) Appl. No.: 17/505,303

(22) Filed: Oct. 19, 2021

(65) Prior Publication Data

US 2022/0034150 A1 Feb. 3, 2022

Related U.S. Application Data

(60) Continuation of application No. 16/677,361, filed on Nov. 7, 2019, now Pat. No. 11,168,511, which is a division of application No. 15/845,717, filed on Dec. 18, 2017, now Pat. No. 10,501,981, which is a continuation of application No. 14/540,030, filed on Nov. 12, 2014, now Pat. No. 9,845,636, which is a continuation-in-part of application No. 14/315,503, filed on Jun. 26, 2014, now Pat. No. 9,234,381, which is a continuation-in-part of application No. 13/735,449, filed on Jan. 7, 2013, now Pat. No. 8,923,650.

(51) Int. Cl.
*E06B 3/28* (2006.01)
*E06B 1/34* (2006.01)
*E06B 3/30* (2006.01)

(52) U.S. Cl.
CPC .............. *E06B 3/28* (2013.01); *E06B 1/34* (2013.01); *E06B 3/285* (2013.01); *E06B 3/30* (2013.01)

(58) Field of Classification Search
CPC ..... E06B 3/28; E06B 1/34; E06B 3/30; E06B 2009/005; E06B 3/285
See application file for complete search history.

(56) References Cited

U.S. PATENT DOCUMENTS

| | | | | |
|---|---|---|---|---|
| 1,694,676 A | * | 12/1928 | Will | ........................ B60J 1/002 52/203 |
| 1,694,677 A | * | 12/1928 | Will | ........................ B60J 1/002 52/203 |
| 3,553,913 A | | 1/1971 | Eisenberg | |
| 4,499,703 A | | 2/1985 | Rundo | |

(Continued)

*Primary Examiner* — Andrew J Triggs
(74) *Attorney, Agent, or Firm* — Troutman Pepper Hamilton Sanders LLP (Rochester)

(57) ABSTRACT

A novel and useful frame less supplemental window for fenestration suitable for use with existing windows. The supplemental window, in one embodiment, comprises plastic sheet material with bullnose edging around it. Corner braces add rigidity and strength to corners in several embodiments. An attachment mechanism secured either to the sheet material or the bullnose edge functions to fasten and/or seal the supplemental window to an existing window. The bullnose edging functions to substantially enclose (i.e. trap) a volume of air between the window pane and the plastic sheet material. The supplemental window is configured such that the layer of trapped air is of an optimum thickness within a preferred range of 0.15 to 0.75 inches to maximize thermal insulation properties of the supplemental window.

13 Claims, 19 Drawing Sheets

(56) References Cited

U.S. PATENT DOCUMENTS

| | | | | |
|---|---|---|---|---|
| 4,648,221 | A * | 3/1987 | Haggqvist | E06B 3/28 |
| | | | | 52/202 |
| 6,848,492 | B2 * | 2/2005 | Thomas | E06B 3/28 |
| | | | | 160/368.1 |
| 8,272,178 | B2 * | 9/2012 | Pardue | E06B 3/28 |
| | | | | 52/204.597 |
| 9,234,381 | B2 * | 1/2016 | Wexler | E06B 3/28 |
| 9,663,983 | B2 * | 5/2017 | Wexler | E06B 9/24 |
| 9,845,636 | B2 * | 12/2017 | Wexler | E06B 1/34 |
| 10,196,850 | B2 * | 2/2019 | Wexler | E06B 3/28 |
| 10,280,679 | B2 | 5/2019 | Kassas | |
| 10,501,981 | B2 * | 12/2019 | Wexler | E06B 1/34 |
| 10,533,364 | B2 * | 1/2020 | Wexler | E06B 3/285 |
| 10,883,303 | B2 * | 1/2021 | Wexler | E06B 3/285 |
| 11,168,511 | B2 * | 11/2021 | Wexler | E06B 1/34 |
| 2021/0102422 | A1 * | 4/2021 | Wexler | E06B 3/30 |
| 2022/0034150 | A1 * | 2/2022 | Wexler | E06B 3/30 |

* cited by examiner

A'−A

FRAMELESS SUPPLEMENTAL WINDOW FOR FENESTRATION

This is a continuation application of U.S. patent application Ser. No. 16/677,361, filed Nov. 7, 2019, which is a divisional application of U.S. patent application Ser. No. 15/845,717, filed Dec. 18, 2017, now U.S. Pat. No. 10,501,981, which is a continuation of U.S. patent application Ser. No. 14/540,030, filed Dec. 12, 2014, now U.S. Pat. No. 9,845,636, which is a continuation in part of U.S. patent application Ser. No. 14/315,503, filed Jun. 26, 2014, now U.S. Pat. No. 9,234,381, which is a continuation in part of U.S. patent application Ser. No. 13/735,449, filed Jan. 7, 2013, now U.S. Pat. No. 8,923,650, which are hereby incorporated by reference in their entirety.

FIELD

The present invention relates generally to fenestration and in particular to a frameless supplemental window and related method of construction and mounting for use with existing windows.

BACKGROUND

In recognition of the ecological and cost impact of fossil fuels and other conventional energy sources, significant effort has been expended in developing methods for more efficient use of such energy sources. An important area of energy use for which greater energy efficiency is needed is the heating and cooling of spaces in which human activity is desired. Many approaches have been developed to decrease the amount heat transfer through the shell of such spaces. One of the most active and important areas of activity is the transfer of energy through fenestration where the activity has included use of window films or inserts, increasing the number of glazings per opening, and window treatments such as drapes, blinds, etc. While these approaches have shown considerable improvement in building energy efficiency, significant problems prevent more widespread and effective utilization.

Several problems exist in the approaches to minimizing heat transfer through fenestration. In particular for existing windows, it is desirable to maintain undistorted optical transparency, operation of the window treatments and windows and the aesthetics of the interior view of the window while providing thermal insulation. Furthermore, reuse of the insulating materials is highly desirable so that new materials do not need to be purchased each season. Supplemental window elements known in the art either require the end user to customize supplemental window elements to the dimensions of each window at the site of installation or are designed in ways that make size customization difficult in manufacturing.

When adding supplemental window elements such as films, film support elements and window treatments, ease of installation (including measurement and fabrication), reusability and storage and aesthetics during and after use are very important while obtaining the thermal and radiation insulation desired. With window films intended for creating an additional "dead air" insulating layer adjacent to the window as well as window treatments, the dimension of the "dead air" space perpendicular to the window pane is subject to the film attachment areas that are generally dictated by existing features of the window and/or frame. In addition, such window films often must be mounted in such a way that inhibits the operability of non-fixed windows. Further, such window films are generally made for use only on the interior side of the window pane. Other window films, such as tints, infrared or ultraviolet reflective, or low-e films, generally adhere directly to the window pane and do not allow for simultaneous formation of an insulating layer.

There is thus a need for a reduced cost frameless supplemental window that overcomes the disadvantages of prior art supplemental windows and that is effective at minimizing heat loss, retaining transparency, is relatively simple to manufacture, easy to install and remove and does not impede the operability of the existing window.

SUMMARY

The present invention is a frameless supplemental window for fenestration suitable for use with existing windows. The supplemental window, in one embodiment, comprises sheet material with an edging seal around it. In some embodiments, corner braces add rigidity and strength to corners in several embodiments. In other embodiments, corner braces provide a portion of the corner closure of the edging seal. An attachment mechanism secured either to the sheet material or the edging functions to fasten and/or seal the supplemental window to an existing window. The edging functions to substantially enclose (i.e. trap) a volume of air between the window pane and the plastic sheet material. The supplemental window is configured such that the layer of trapped air is of an optimum thickness within a preferred range of 0.15 to 0.75 inches to maximize thermal insulation properties and mechanical stability of the supplemental window when mounted.

Several advantages of the supplemental window include (1) frameless designs that significantly reduce material cost; (2) decreased heat transfer through the window area; (3) retaining visual transparency through the window; (4) having a reduced cost of manufacture; and (5) designable so as to not impede the operability of the existing window or associated window treatments.

The aesthetics of the fenestration during and after use of the supplemental window can be maintained. This relates to maintaining the appearance of the interior view of the fenestration and its immediate surrounding as well as the ability to see through the fenestration when desired. Also, it relates to the ability to return the fenestration to its original state when the supplemental element is not being used without the need to repair mounting areas.

Operability of the fenestration and associated treatment during use of the supplemental window can be maintained without the need to demount the supplemental window. Since the fenestration is often designed for opening and closing, it is beneficial to maintain this capability while the supplemental window is in place. This would allow for temporarily bringing fresh air into the space adjacent to the fenestration. This can be particularly useful during periods of moderate temperatures within a heating or cooling season.

The supplemental window also provides the ability to gain energy efficiency improvement during both heating and cooling seasons. The advent of spectrally selective, infrared reflective and low-emissivity coatings or laminates for window films provides for additional energy savings. Incorporation of such coatings or films in the sheet and/or edging provides an opportunity for combining these additional energy saving technologies with the insulating properties provided by the substantially enclosed air volume provided by the present invention. Optimal placement of such films, however, requires the ability to move such films to either keep heat in during the heating season or keep heat out in the cooling season.

There is thus provided in accordance with the invention, a supplemental window apparatus, comprising a substantially non porous sheet material having dimensions defining a perimeter area of a window pane, a seal attached to the edges of the sheet material and shaped such that when the supplemental window apparatus is attached to the window pane, a volume of gas is substantially enclosed between the window pane and the sheet material, wherein the seal comprises an attachment mechanism operative to releasably attach the supplemental window apparatus to a window and to seal the supplemental window apparatus to the window pane, and wherein the sheet material is positioned substantially parallel to the window pane.

There is also provided in accordance with the invention, a supplemental window apparatus, comprising a substantially non porous sheet material having dimensions defining a perimeter area of a window pane, a seal attached to the edges of the sheet material and shaped such that when the supplemental window apparatus is attached to the window pane, a volume of gas is substantially enclosed between the window pane and the sheet material, the seal comprising an attachment mechanism operative to releasably attach the supplemental window apparatus to a window frame or to seal the supplemental window apparatus to the window pane, and wherein the sheet material is positioned substantially parallel to the window pane.

There is further provided in accordance with the invention, a supplemental window apparatus, comprising a substantially non porous sheet material having dimensions defining a perimeter area of a window pane, a post and attachment mechanism operative to releasably attach the supplemental window apparatus to the window pane, wherein the post and attachment mechanism determine the distance between the window pane and the sheet material when the supplemental window apparatus is attached to the window pane, a seal attached to the edges of the sheet material and shaped such that when the supplemental window apparatus is attached to the window pane, a volume of gas is substantially enclosed between the window pane and the sheet material, and wherein the sheet material is substantially parallel to the window pane.

BRIEF DESCRIPTION OF THE DRAWINGS

The invention is herein described, by way of example only, with reference to the accompanying drawings, wherein.

DETAILED DESCRIPTION

Figure 1:
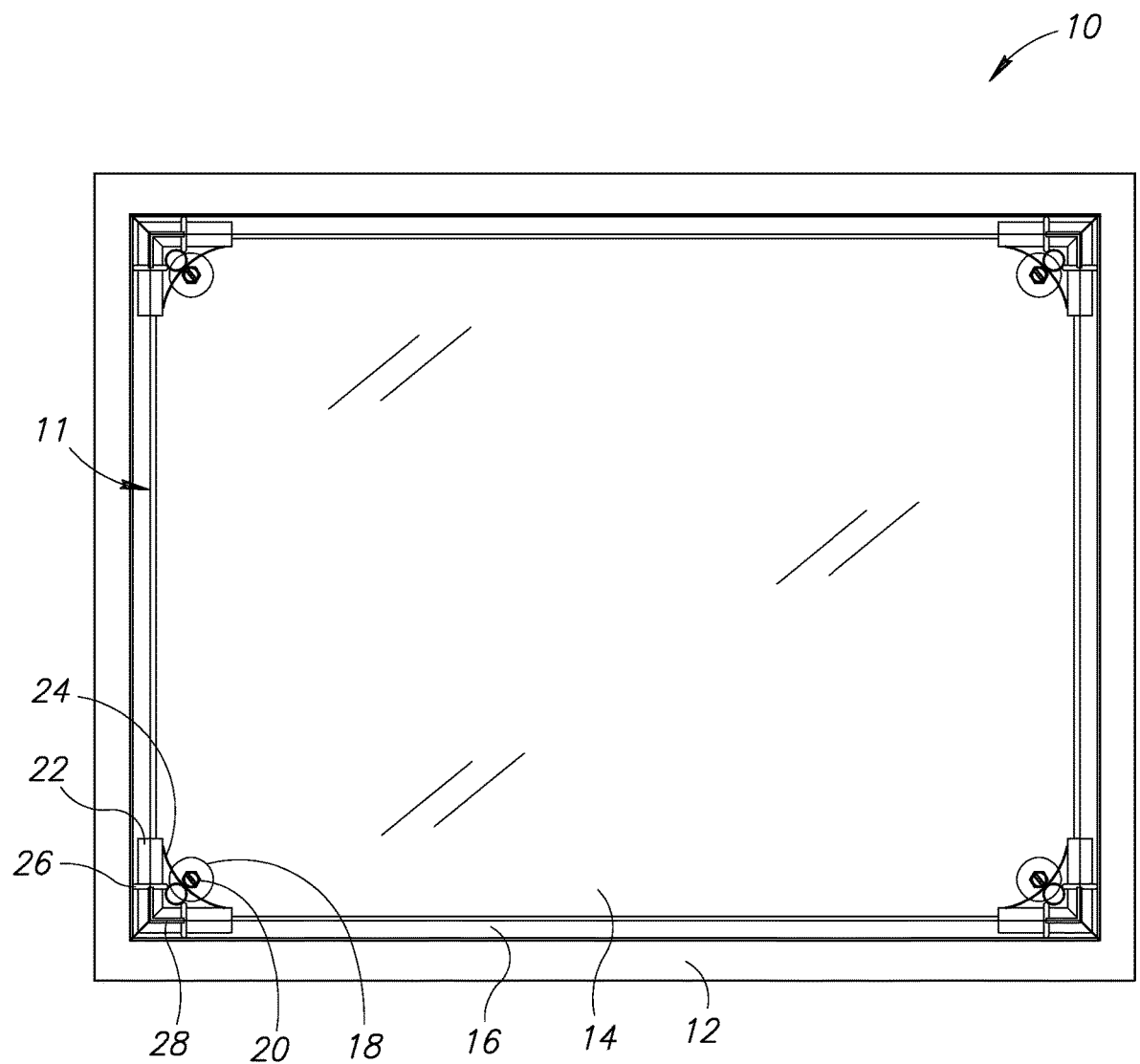
FIG. 1 is a diagram illustrating a front view of a first example frameless supplemental window.

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The present invention provides for several embodiments for mounting of sheet material in or over fenestration and substantially enclosing a volume of gas in or adjacent to the fenestration. The term "frameless supplemental window" in the present invention refers to a supplemental window that lacks a substantially rigid or non-flexible structure surrounding an area that is approximately the same size as the window pane on which the supplemental window is to be mounted.

In the present invention, in one embodiment, sheet material, a spacer or post of predetermined dimension perpendicular to the sheet material, a bullnose edge seal and a corner brace and spring mechanism are combined together to provide a frameless supplemental window unit that substantially encloses and traps a volume of gas (typically air but not limited to air). Optionally, the sheet material (typically clear but may be tinted or coated) may function as a portion of the edge seal. In one embodiment, the post may contact or attach to the window pane of the fenestration. The sheet material can be any desired type of material such as, but not limited to, clear, non-opaque, translucent, low emissivity, semi-transparent, opaque, visible light transmitting, infrared reflecting or a material having minimal refractive distortion when viewed from the interior side of the window, etc. The extent of visible light transmission properties of the sheet material is not critical to the invention.

Note that such embodiments may be specified using manual measurement of the fenestration or portions thereof or, specified and delivered using the methods described in U.S. application Ser. No. 13/735,449 to Wexler cited supra and U.S. application Ser. No. 14/320,973, entitled "System And Method Of Measuring Distances Related To An Object" to Wexler et al., both of which are incorporated herein by reference in their entirety. In addition to these measurement methods, the methods described in U.S. application Ser. No. 14/320,973 may be used to confirm the accuracy of manual measurements that may be provided to the service provider or fabricator as well as to provide feedback to the manual measurement provider regarding such accuracy, optionally including a request for re-measurement.

Various terms are used in the art to describe aspects of fenestration and windows in particular. In describing the present invention, "window" may refer to window components within a single frame that includes one light or multiple lights that are not separated by a mullion or transom. In describing the present invention, the terms "interior" and "exterior" are used to describe the indoor side and outdoor side, respectively, relative to a perimeter wall in which the fenestration resides. "Inward" and "outward" refers to location in a direction closer to and further from, respectively, the center of the fenestration.

Note that various people or entities may perform different aspects of the present invention. An "end user" refers to a person or entity or their designee, that specifies, orders, installs or uses the supplemental parts of the present invention and may perform digital image capture, supply metadata and/or confirmation of design steps of the process of the present invention. A "service provider" refers to a person or entity performing a service that is part of the method of the present invention such as reviewing and accepting or confirming orders from an end user, providing image processing capability, designing (as a "designer"), fabricating (as a "fabricator") or installing (as an "installer") parts, or providing support for installation of such parts.

Each supplemental window embodiment creates a substantially "dead air" space or layer of substantially enclosed or trapped air adjacent to a window pane, preferably having a dimension between the window pane and clear sheet in the range of approximately 0.15 to 0.75 inches that provides insulating properties and preferably inhibits the formation of convective loops. A dimension less than about 0.15 inches will likely impact insulating properties and a dimension greater than about 0.75 inches will likely lead to undesirable convective heat transfer. Such "dead air" spaces optionally may have a desiccant material contacting the "dead air" space to keep the humidity of the space low and decrease the possibility of condensation forming in the space, particularly when one side of the space is a window pane in direct contact with the outdoors.

To allow for actuation of window or window treatment operating elements with the supplemental parts mounted, the plastic sheet may be mounted such that the entire supplemental window unit is mounted such as not to interfere with movement or actuation of any window treatment, window treatment operating elements or moveable portions of the window.

A diagram illustrating a front interior view of a first example frameless supplemental window is shown in FIG. 1. The window, generally referenced 10, comprises an existing window frame or sash 12, a frameless supplemental window 11 mounted on the existing window and window pane (not in view) exterior to the supplemental window 11. Note that the supplemental window may be mounted to the exterior side of the window pane such that the window pane is to the interior of the supplemental window. The supplemental window comprises sheet material 14, a bullnose edge or seal 16, corner brace 22, post 20 with attachment mechanism 18 (e.g., suction cup), spring 24 and seals 26 and 28 (e.g., pile, O-ring, gel, dry adhesive material, foam, etc.). Note that the sheet material defines a perimeter area that extends between the edge of the sheet projected onto the window pane and the nearest edge of the window pane. Also, note that while the seal 16 of this embodiment as well as seal embodiments described infra show a bullnose shape, other shapes that seal to the sheet and form an enclosed space with the window pane may be used in the current invention. Such other shapes may include, but are not limited to, a rectangular "[" shape, triangular "<" shape or shape edge or seal.

The sheet material may comprise, for example, a polymer plastic material such as polyethylene terephthalate (PET), polyethylene terephthalate glycol (PET-G) or polypropylene (UV stabilized preferred) or thin flexible glass such as is known in the art. When using polymer plastic material such as PET, the recommended thickness is in the range from about 3 to about 20 mil with 5 to 10 mil thickness preferred. Note that polymer plastic sheets thicker than approximately 60 mil may lead to pane attachment failure and more difficult handling for the user. Sheets thinner than about 3 mil may lead to handling difficulty in manufacture, ease of out of plane deformation/deflection when mounted and reduced durability. The factors used in determining the thickness include ease of handling by the user, weight constraint for reduced cost, the mounting integrity and the size of the attachment (i.e. higher weight may necessitate larger attachment area to the window pane. For example, to stay within a standard "mini" size suction cup total rating of about 2 pounds for four suction cups, a sheet thickness less than about 70 mil is required for PET material or less than about 40 mil for flexible glass for a sheet area of about two square feet. However, when using other attachment mechanisms, such as dry adhesive mechanisms describe infra, thicker sheet material may be used as a result of high load capability and larger attachment surface area. The combination of thermally shaped seal beam strength and sheet thickness provides ease of handling. For PET, a sum of the edging seal and sheet thicknesses is preferably greater than about 6 mil for ease of handling.

Figure 2:
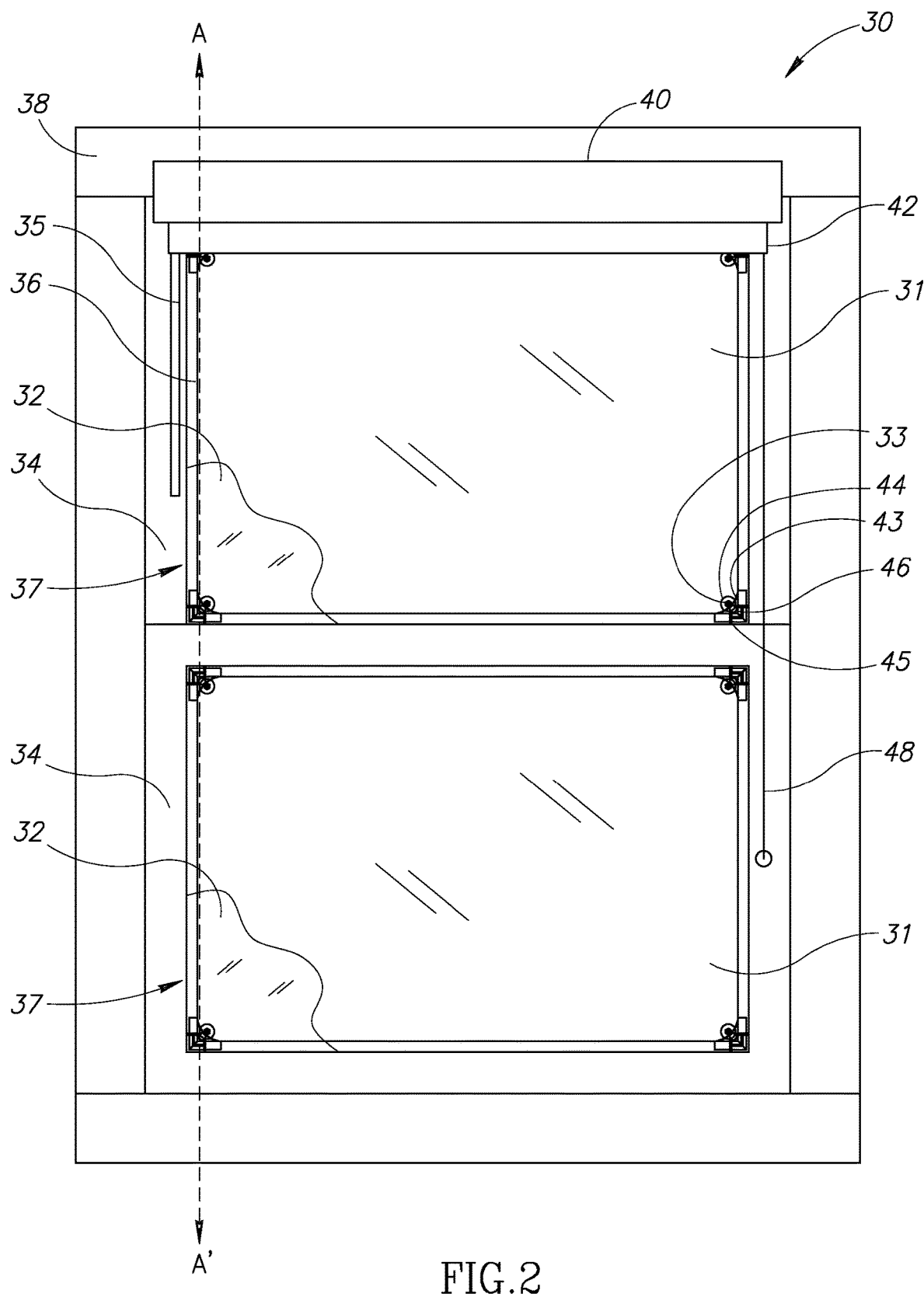
FIG. 2 is a diagram illustrating a front view of a second example frameless supplemental window.

A diagram illustrating a front view of a second example frameless supplemental window is shown in FIG. 2. The vertical sliding window, generally referenced 30, comprises an existing window frame 38 such as found in vertical sliding (single or double hung) windows having a bottom sash that is moveable. The upper and lower window sashes each have a frameless supplemental window installed on the upper and lower window panes 31, respectively. The sheet material 32 of the lower and upper supplemental windows is partially shown for illustration purposes and normally covers nearly all or all of the window pane. The window 30 comprises an existing window frame 38, upper and lower sash 34 holding the window panes 31, upper and lower frameless supplemental window 37, window treatment (e.g., blind) including header 40, retracted blind 42, lift cord 48 and wand 35. Each supplemental window 37 comprises sheet material 32, a bullnose edge or seal 36, corner brace 46, post 33 with attachment mechanism 44 (e.g., suction cup), spring 43 and seal (e.g., pile, O-ring, gel, dry adhesive material, foam, etc.) 45.

Figure 3:
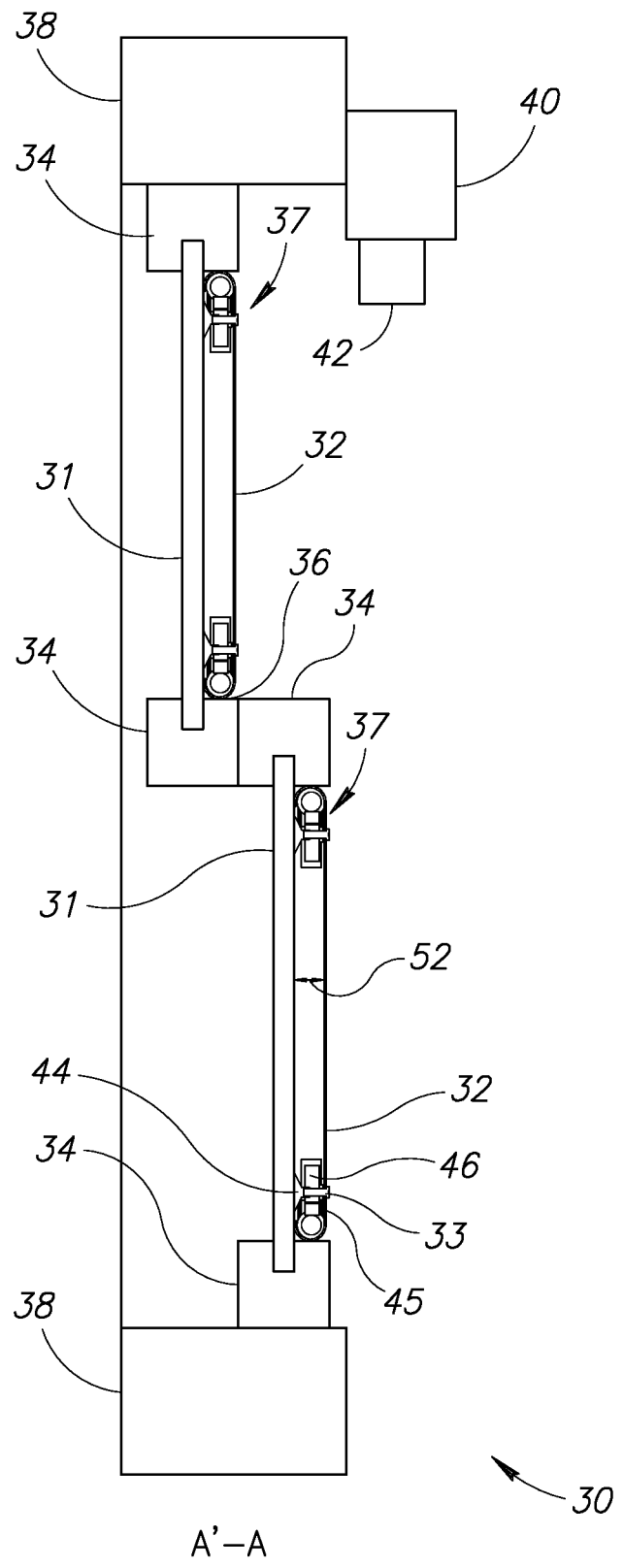
FIG. 3 is a diagram illustrating a side sectional view A-A' of the example window of FIG. 2.

A diagram illustrating a side sectional view A-A' of the example window of FIG. 2 is shown in FIG. 3. The window, generally referenced 30, comprises lower and upper existing window frame and sill 38, window treatment (e.g., blind) including header 40, retracted blind 42, upper and lower window pane 31, upper and lower sash rails 34 of the upper and lower windows and upper and lower supplemental windows 37. Both upper and lower supplemental windows 37 comprise sheet material 32, corner brace 46, post 33 with attachment mechanism 44 (e.g., suction cup), bullnose edge or seal 36, seal (e.g., pile, O-ring, gel, foam, etc.) 45 creating substantially enclosed or trapped space (e.g., air) 52 between the plastic sheet and window pane.

In the window of FIGS. 2 and 3, the attachment mechanism and viewable area through the plastic sheet are predominantly within the pane viewable area. For interior or exterior mounting, the supplemental window unit spacing and thickness dimensions perpendicular to the pane 31 that would reside within the sash-to-sash interface during opening and closing operation of the window may beneficially be made smaller than the spacing and thickness dimensions of the supplemental window unit perpendicular to the pane 31 that would not reside in the sash-to-sash interface during operation of the window. As is also shown in FIGS. 2 and 3, the supplemental window unit on the top sash is exterior to the movement path of the bottom sash so that the window remains operable with the supplemental window unit in place. In the case of vertical or horizontal sliding windows, the supplemental window sheet to pane spacing dimension over the stationary portion may beneficially be made smaller (e.g., to as small as about 0.15 inch) than the supplemental window sheet to pane spacing dimension over the sliding portion to allow the custom supplemental window unit to remain in place when opening the window by sliding the sliding portion. In such a case, the supplemental window members for mounting the plastic sheet should also have a dimension perpendicular to the attached sheet of less than about 0.25 inch. A similar mounting arrangement may be used for horizontal sliding windows to allow operability of the window. Alternatively, operability of the sliding portions of windows may be achieved by dismounting the supplemental parts on the stationary sash prior to opening the window and remounting after closing the window. In such cases, the supplemental window unit spacing dimension on the non-moving sash may be made larger than the distance between the non-moving sash pane and movable sash.

Figure 4A:
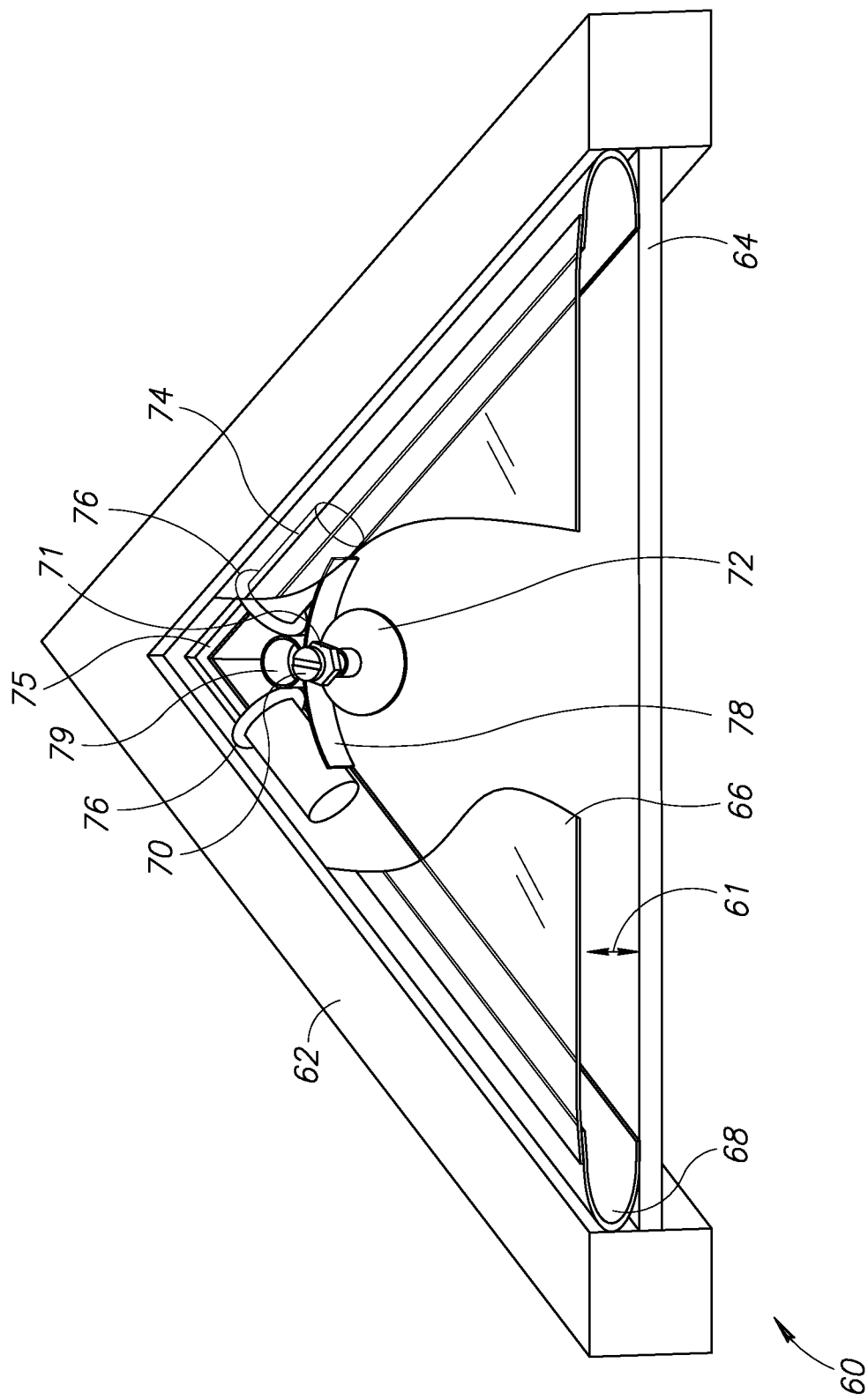
FIG. 4A is a diagram illustrating a perspective view of one embodiment of the frameless supplemental window.

A diagram illustrating a perspective view of one embodiment of the frameless supplemental window is shown in FIG. 4A. The window, generally referenced 60, comprises the window frame or sash 62, window glass pane 64, sheet material 66, bullnose edge seal 68, corner brace 74, O-ring or pile seal 76, strip 75, post 70, attachment mechanism 72 and springs 78, 79. While two springs are shown, either one alone may be used or both may be used together. The sheet material is only partially shown to allow the corner area of the supplemental window to be shown. In one embodiment, sheet material 66 is a separate part from but bonded to the bullnose edge seal part 68. They may comprise the same or different materials and/or the same material but different thicknesses. Alternatively, sheet 66 and edging 68 may be fabricated from the same single sheet of material as a unitary element. While edging 68 is shown in a preferred attaching configuration to the surface of sheet 66 that is closer to pane 64, this attachment may alternatively be made to the surface of sheet 66 that is further from pane 64. The bullnose edge can be formed by forcing the edge into an arced shape and heat treating the material while in such arced shape such that the material retains an approximate 'C' shape after the heat source is removed. The arc generated by the bullnose edge compresses upon mounting, contacts the pane near its perimeter substantially enclosing the air space and aids in keeping the sheet material from sagging toward the window pane. Suitable materials for use as the bullnose edge include polyethylene terephthalate (PET), polyethylene terephthalate glycol-modified (PETG), polypropylene, or polyethylene, e.g., about 2 mil to about 10 mil thick, preferably about 2 mil to about 6 mil thick PET commercially available under a variety of trade names. When using polyethylene or polypropylene, it is preferred to include an ultraviolet stabilizer in the material. The edge material may be optically clear, semi-transparent, translucent or opaque. Non-limiting examples of non-clear materials include plastic materials comprising gas or air micro-voids or high index materials, such as an inorganic oxide or sulfate materials, such as may be found in commercially available materials such as Melinex™ or Hostaphan™ products. While the edge material embodiments described show the edge material to comprise an open arc, the edge material may comprise a closed arc such as would be formed using, for example, extruded tubing having a wall thickness similar to that described for the open arc.

The post 70 pierces and is fastened to the sheet material via any suitable mechanism such as a screw 70 and nut 71. The attachment mechanism 72 is fastened to the portion of the post adjacent to the pane 64. In this example, the attachment mechanism is a suction cup. Additional options for the attachment mechanism are described in more detail infra. The spring mechanism in this example comprises a relatively flat plastic or metal band 78 fastened to a circular shaped element 79. Resting against the post, the function of the spring mechanism is to apply an outward force against the corner brace 74 to maintain its position against the corner of the window frame or sash 62. Alterative options for the spring mechanism are described in more detail infra.

The corner brace 74 may be fabricated from any suitable material such as a solid plastic or a closed cell foam and may function to provide structural rigidity to the corner portions of the supplemental window, to provide a platform for one or more seals 76 to prevent the leakage of air into or out of the trapped air layer 61 formed between the sheet material 66 and the window pane 64, or to provide a mechanism for preventing such leakage in instances when the corner is not otherwise sealed. The strips 75 may comprise any material having appropriate sealing properties such as elastomer (such as silicone), plastic, pile, foam, felt etc. In addition, it may comprise a material that is sufficiently tacky to hold the corner brace in its proper position. Such a material may comprise, gel, releasable adhesive, glue, etc. Alternative options for the corner brace and sealing mechanisms are described in more detail infra.

Note that in this embodiment, the combination of the post and attachment mechanism not only provides the means of attaching the supplemental window to the window pane but also sets the optimum spacing between the window pane and the sheet material. Alternatively, these functions may be provided by independent elements, e.g., a separate discreet offset spacer may be inserted between the window pane and the sheet material, the spacer function is provided by a spacer mechanism (e.g., post, etc.) or any other suitable means for providing this function. In these alternative embodiments, the attachment mechanism is not required to perform any spacing function and thus there is no spacing related constraint on the dimensions of this element.

Note that the spacing function can be achieved in numerous ways with the actual implementation not critical to the invention. In one embodiment, the spacing function can be provided by a discrete spacer part (not shown). In another embodiment, the spacer function can be incorporated into the attachment mechanism (i.e. the post or mounting mechanism) can be made a specific length to provide the proper spacing between the window pane and plastic sheet. In yet another embodiment, the spacer function can be provided by a stiff bullnose edge material or a closed corner comprised of a contiguous or welded bullnose edge material. Alternatively, the spacing function can be incorporated into the corner brace via a projection or other means where the thickness of the corner brace and any projection is set to a length that provides the proper spacing between the window pane and plastic sheet.

Figure 4B:
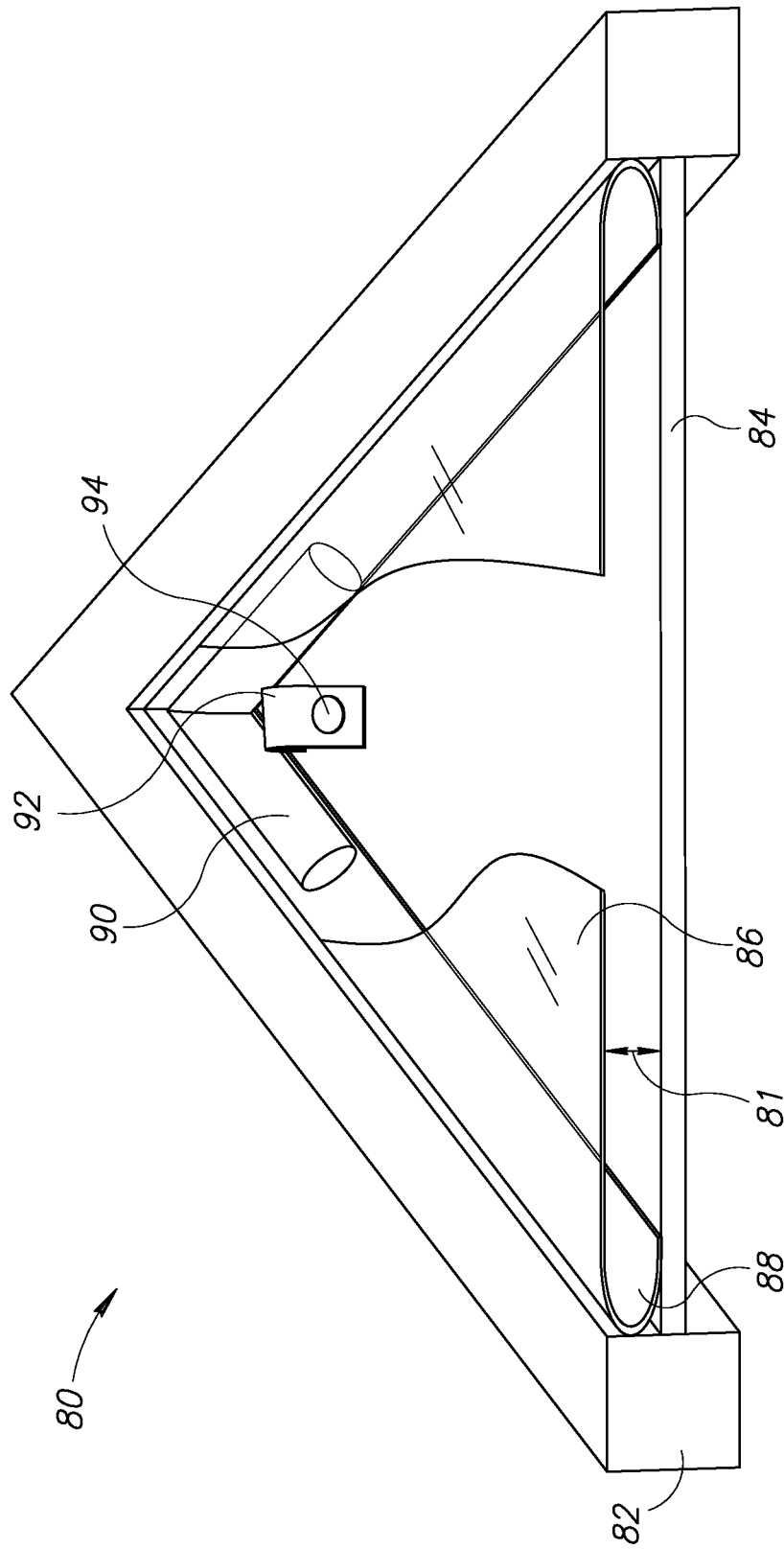
FIG. 4B is a diagram illustrating a perspective view of another embodiment of the frameless supplemental window.

A diagram illustrating a perspective view of another embodiment of the frameless supplemental window is shown in FIG. 4B. The window, generally referenced 80, comprises the window frame or sash 82, window glass pane 84, sheet material 86, bullnose edge seal 88, corner brace 90, optional O-ring or pile seal (not shown), spring mechanism 92 and fastener 94. The sheet material is only partially shown to allow the corner area of the supplemental window to be shown. In one embodiment, sheet material 86 is separate from but bonded to the bullnose edge seal 88. They may comprise the same or different materials and/or the same material but different thicknesses. Alternatively, they made be fabricated from the same single sheet of material as a unitary element. The bullnose edge can be formed by forcing the edge into an arced shape and heat treating the material while in such arced shape such that the material retains an approximate 'C' shape after the heat source is removed.

In this embodiment, the spring mechanism 92 comprises a 'C' shaped piece of plastic or metal fastened to the sheet material via any suitable means 94 such as a screw, rivet, adhesive, etc., which may or may not pierce the sheet material. The function of the spring mechanism is to apply force against the corner brace 90 to maintain the position of the corner brace in the corner of the window frame 82. The spring mechanism may or may not also function to determine the optimal spacing 81 for the trapped air layer between the sheet material 86 and the window pane 84. Spring mechanism 92 may be used in conjunction with attachment mechanisms describe supra and infra.

Figure 4C:
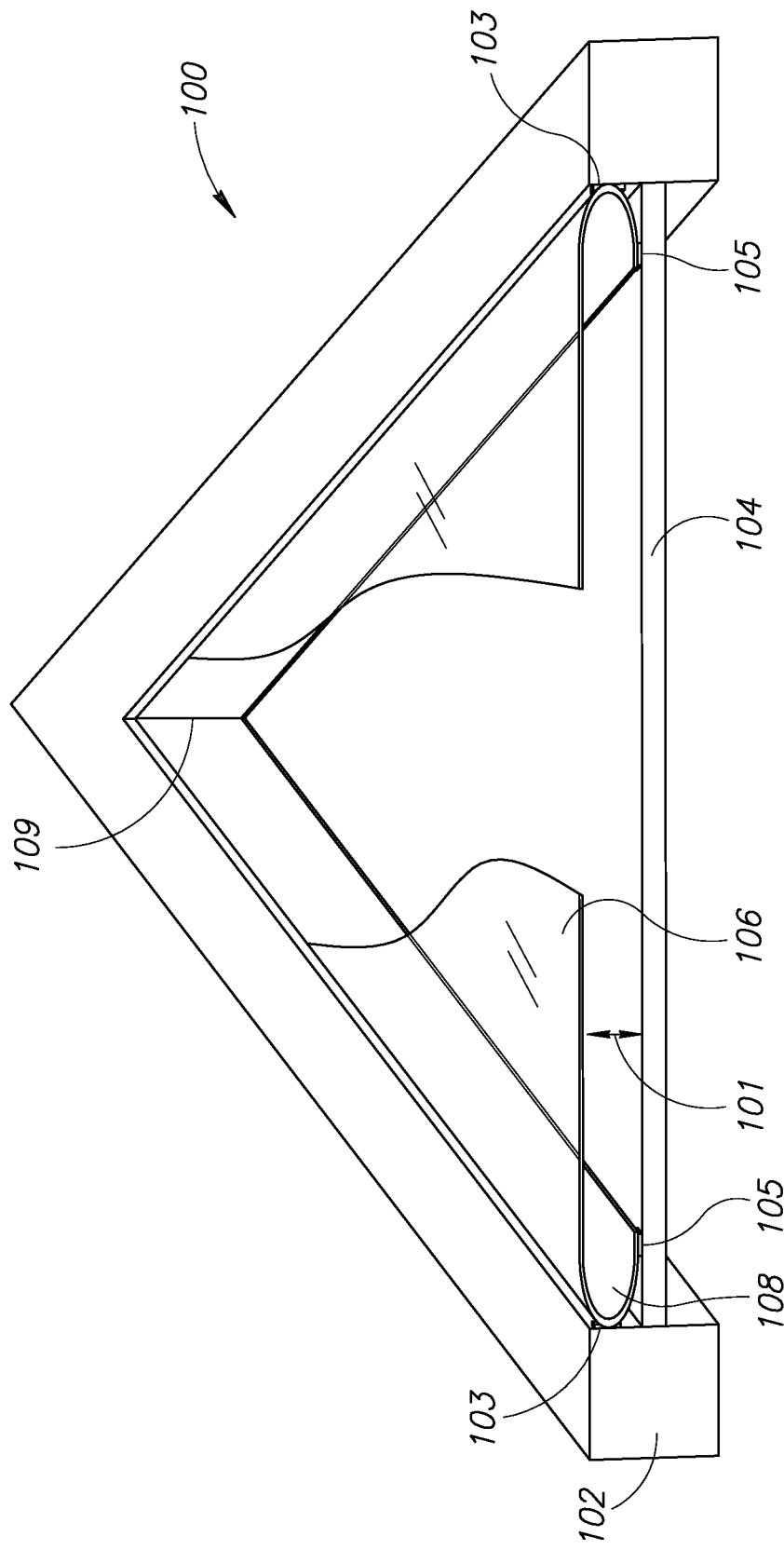
FIG. 4C is a diagram illustrating a perspective view of an additional embodiment of the frameless supplemental window.

A diagram illustrating a perspective view of an additional embodiment of the frameless supplemental window is shown in FIG. 4C. This example embodiment is not only frameless but also lacks a corner brace and spring unlike the embodiments of FIGS. 4A and 4B described supra. The window, generally referenced 100, comprises the window frame or sash 102, window glass pane 104, sheet material 106 and bullnose edge seal 108. The sheet material is only partially shown to allow the corner area of the supplemental window to be shown. The sheet material 106 can be separate from but bonded to the bullnose edge seal 108 as described supra, or as shown in this embodiment, they may be constructed from the same material as a single entity. They may comprise the same or different materials and/or the same material but different thicknesses. Alternatively, they made be fabricated from the same single sheet of material as a unitary element. The bullnose edge can be formed by forcing the edge into an arced shape and heat treating the material while in such arced shape such that the material retains an approximate 'C' shape after the heat source is removed.

In this embodiment, the corners of the bullnose edge are mitered and bonded using any suitable means, such as gluing, heat welding, laser welding, ultrasonic welding, solvent welding, stapling, etc. Regardless of the actual mechanism used to form the mitered corners, it is important that the bond be substantially air tight so as to prevent leaks of air into or out of the enclosed or trapped air layer 101. The portion of such bullnose edge corner that is perpendicular to sheet 106, shown as corner 109, may be a contiguous piece of bullnose edge material or may be a joint formed by separate bullnose edge 108 pieces bonded using any of the suitable means supra.

In addition, the bottom portion of the bullnose edge seal 108 optionally comprises a strip 105 of sealing material substantially along the entire perimeter defined by the bullnose edge seal adjacent to pane 104. This sealing material may comprise any suitable material such as an oil coating, grease coating, gel, dry adhesive material, foam, rubber, etc. Examples of suitable dry adhesive materials include nano-suction adhesive material EverSTIK Nanosuction material sold by UM! Brands, Chino, California, USA, materials and methods such as those described in U.S. Pat. Nos. 8,206,631; 8,398,909; and U.S. Publication Nos. 2012/0319320; 2012/0328822; and 2013/0251937 or Geckskin™ materials and structures. Preferably, the properties of the material are sufficient to provide functions of both (1) sealing the trapped air layer; and (2) affixing (i.e. adhering) the supplemental window to the window pane. These functions may be achieved by a single strip 103 or 105 of material placed, respectively, at the side of the bullnose edge contacting the window frame or sash 102, or at the bottom (near the pane 104) of the bullnose edge. Alternatively, they may be achieved utilizing two separate strips of materials: (1) a first strip 105 on the bottom of the bullnose edge for sealing the trapped air layer; and (2) a second strip 103 on the side of the bullnose edge for contacting the supplemental window to the window frame or sash. Alternatively, the functions of the strips may be reversed with the strip on the side of the bullnose edge providing sealing and the strip on the bottom of the bullnose edge providing adhesion to the window pane. In the embodiment of FIG. 4C, the bullnose edge seal along edges or at corners such as in FIG. 11A infra provide the desired sheet to pane spacing.

Figure 5A:
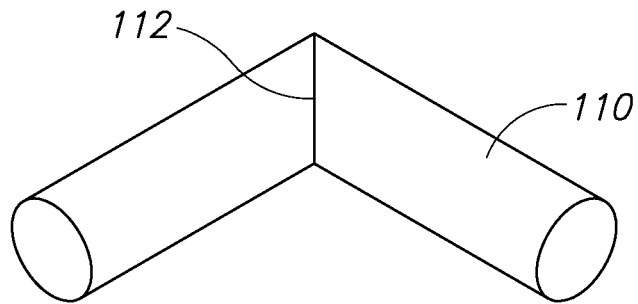
FIG. 5A is a diagram illustrating a first example of the corner brace.

Several options for the construction of the corner brace component will now be described. A diagram illustrating a first example of the corner brace is shown in FIG. 5A. In this embodiment, the corner brace comprises a substantially solid cylindrical shaped material 110 having a mitered or otherwise formed inside corner 112. The corner brace may be constructed from any suitable material such closed cell foam, solid plastic, etc. As described supra, the corner brace may function to provide structural rigidity and corner closure for the supplemental window when placed in a window frame or sash.

Figure 5B:
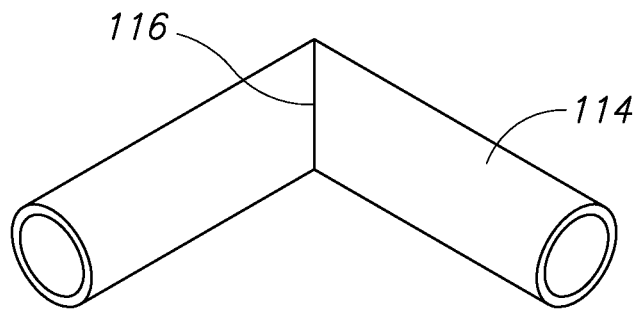
FIG. 5B is a diagram illustrating a second example of the corner brace.

A diagram illustrating a second example of the corner brace is shown in FIG. 5B. In this embodiment, the corner brace comprises a substantially hollow cylindrical shaped material 114 having a mitered or otherwise formed inside corner 116. The corner brace may be constructed from any suitable material such closed cell foam, solid plastic, etc.

Figure 5C:
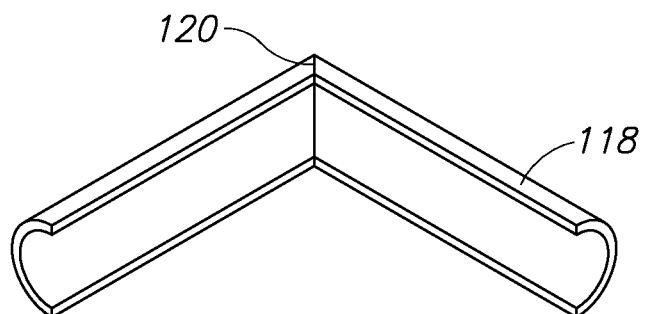
FIG. 5C is a diagram illustrating a third example of the corner brace.

A diagram illustrating a third example of the corner brace is shown in FIG. 5C. In this embodiment, the corner brace comprises an approximate half hollow cylindrical shaped material 118 having a mitered or otherwise formed inside corner 120. The corner brace may be constructed from any suitable material such closed cell foam, solid plastic, etc.

Figure 5D:
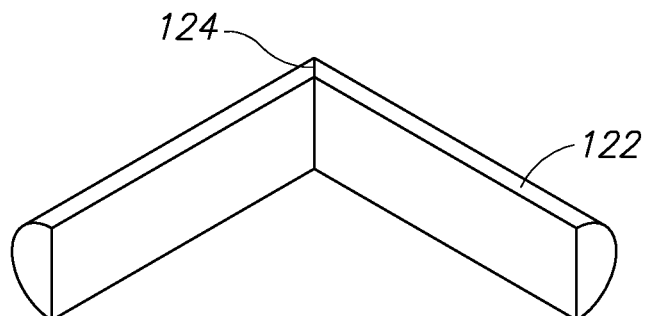
FIG. 5D is a diagram illustrating a fourth example of the corner brace.

A diagram illustrating a fourth example of the corner brace is shown in FIG. 5D. In this embodiment, the corner brace comprises an approximate half solid cylindrical shaped material 122 having a mitered or otherwise formed inside corner 124. The corner brace may be constructed from any suitable material such closed cell foam, solid plastic, etc.

Figure 6A:
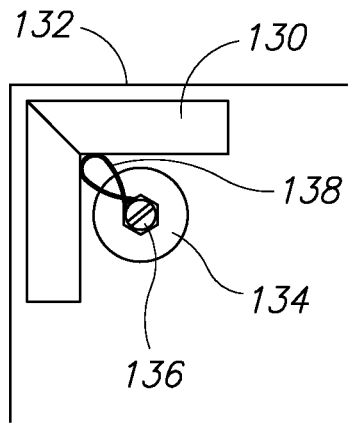
FIG. 6A is a diagram illustrating a first example of the spring mechanism.

Several options for the construction of the spring mechanism will now be described. A diagram illustrating a first example of the spring mechanism is shown in FIG. 6A. In this embodiment, the spring 138 is fashioned as an elliptical or tear drop shaped loop from any suitable flexible material, e.g., plastic, metal, etc. It is sandwiched between the post 136 (held in position by the suction cup 134) and corner brace 130 and operative to apply an outward spring force to push the brace 130 and the bullnose corner 132 into the corner of the window frame (not shown).

Figure 6B:
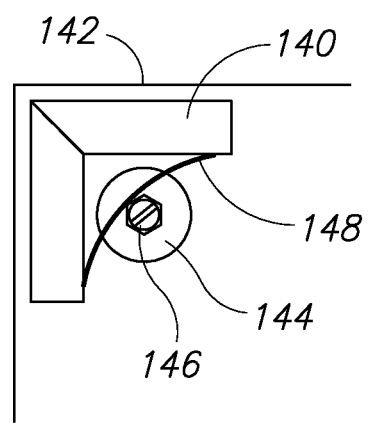
FIG. 6B is a diagram illustrating a second example of the spring mechanism.

FIG. 6B is a diagram illustrating a second example of the spring mechanism is shown in FIG. 6B. In this embodiment, the spring 148 is fashioned as a flat or curved band from any suitable flexible material, e.g., plastic, metal, etc. It is compressed and placed between the post 146 (held in position by the suction cup 144) and corner brace 140 and operative to apply an outward spring force to push the brace 140 and the bullnose corner 142 into the corner of the window frame (not shown).

Figure 6C:
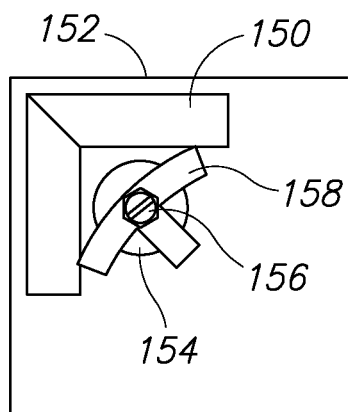
FIG. 6C is a diagram illustrating a third example of the spring mechanism.

FIG. 6C is a diagram illustrating a third example of the spring mechanism is shown in FIG. 6C. In this embodiment, the spring 158 is fashioned as a 'T' shaped flat or curved band from any suitable material, e.g., plastic, metal, foam (such as closed cell foam), etc. It is compressed and placed between the post 156 (held in position by the suction cup 154) and corner brace 150 and operative to apply an outward spring force to push the brace 150 and the bullnose corner 152 into the corner of the window frame (not shown).

Figure 6D:
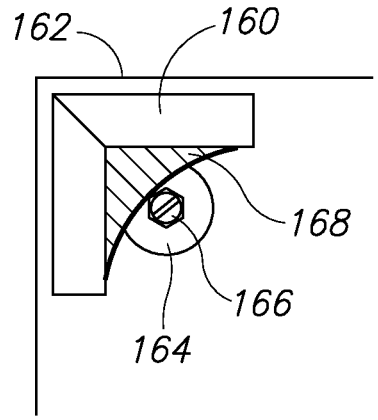
FIG. 6D is a diagram illustrating a fourth example of the spring mechanism.

FIG. 6D is a diagram illustrating a fourth example of the spring mechanism is shown in FIG. 6D. In this embodiment, the spring 168 is fashioned as a trapezoidal or triangular shaped piece from any suitable compressible material, e.g., foam, etc. It is compressed and placed between the post 166 (held in position by the suction cup 164) and corner brace 160 and operative to apply an outward spring force to push the brace 160 and the bullnose corner 162 into the corner of the window frame (not shown).

Figure 6E:
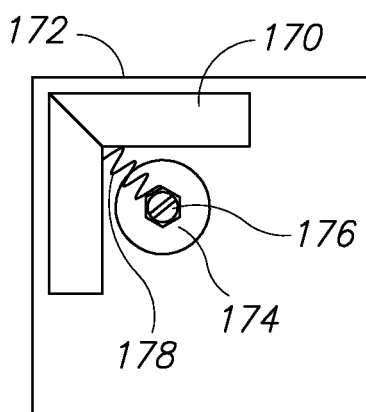
FIG. 6E is a diagram illustrating a fifth example of the spring mechanism.

FIG. 6E is a diagram illustrating a fifth example of the spring mechanism is shown in FIG. 6E. In this embodiment, a conventional spring 178, such as a helical spring, constructed from any suitable material, e.g., plastic, metal, etc. It is compressed and placed between the post 176 (held in position by the suction cup 174) and corner brace 170 and operative to apply an outward spring force to push the brace 170 and the bullnose corner 172 into the corner of the window frame (not shown).

Several options for the construction of the corner sealing mechanism will now be described. Note that in each option, a solid corner brace is used as an example. It is appreciated that each sealing mechanism option may be modified to accommodate any of the corner brace options shown in FIGS. 5A, 5B, 5C and 5D.

Figure 7A:
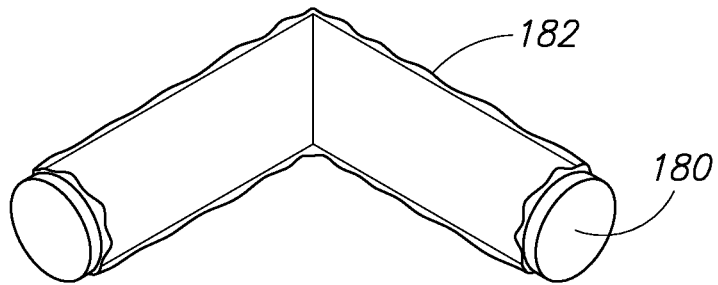
FIG. 7A is a diagram illustrating a first example of the corner sealing mechanism.

A diagram illustrating a first example of the corner sealing mechanism is shown in FIG. 7A. This first example corner sealing mechanism comprises a substantially solid corner brace 180 coated either wholly or partially with a suitable material 182. The corner brace 180 arm cross section may take any appropriate shape such as cylindrical, rectangular, square, elliptical, etc. so long as its combination with other sealing materials inhibits air flow in to or out of the substantially enclosed space. It may comprise a solid plastic or a compressible foam material (open or closed cell) having sufficient rigidity and impermeability in combination with material 182 to provide the necessary strength, shape and sealing to the corners of the supplemental window. The coating or layer 182 may comprise a material that has sealing properties such as an oil, grease, gel, etc. In addition, it may comprise a material that is sufficiently tacky to hold the corner brace in its proper position. Such a material may comprise, gel, releasable adhesive, glue, etc. In addition, the coating may comprise a material having both sealing and tacky properties.

Figure 7B:
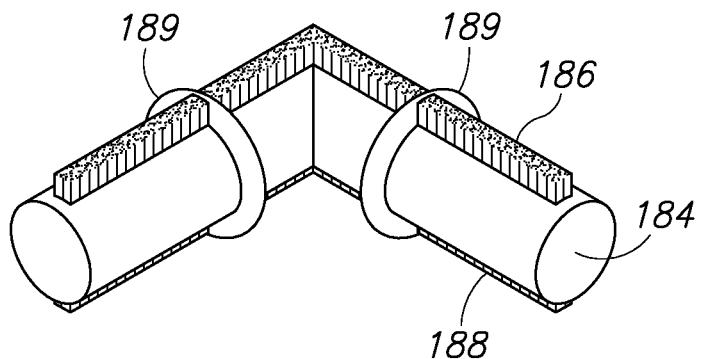
FIG. 7B is a diagram illustrating a second example of the corner sealing mechanism.

A diagram illustrating a second example of the corner sealing mechanism is shown in FIG. 7B. This second example corner sealing mechanism comprises a substantially impermeable corner brace 184 having one or more strips 186, 188 (two shown in this example) of a suitable material. The corner brace may take any appropriate shape such as cylindrical, rectangular, square, elliptical, etc. It may comprise a solid plastic or a compressible foam material (open or closed cell) having sufficient rigidity to provide the necessary strength to the corners of the supplemental window. The strips of material are preferably located on the top (sheet side) and bottom (pane side) portions of the corner brace 184 such that one of the strips contacts the sheet and the other strip contacts the pane when mounted. The strips 186, 188 may comprise a material that have sealing properties such as an oil, grease, gel, O-ring cord, etc. or air transport inhibition properties such as foam or pile. In addition, it may comprise a material that is sufficiently tacky to hold the corner brace in its proper position. Such a material may comprise, gel, releasable adhesive, glue, etc. In addition or alternatively, the strips may comprise a material having both sealing and tacky properties. Additional sealing is also be provided by O-ring seals 189, comprising pile, foam or a suitable elastomer such as silicone, placed on the arms of the corner brace 184.

Figure 7C:
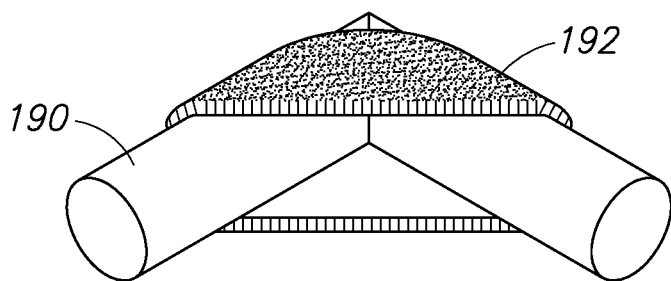
FIG. 7C is a diagram illustrating a third example of the corner sealing mechanism.

A diagram illustrating a third example of the corner sealing mechanism is shown in FIG. 7C. This third example corner sealing mechanism comprises a substantially impermeable corner brace 190 having one or more sealing bands 192 (one shown in this example) wrapped around the arms of the corner brace. The band 192 comprises a suitable material to provide sealing and/or tackiness/grip. The corner brace may take any appropriate shape such as cylindrical, rectangular, square, elliptical, etc. It may comprise a solid plastic or a compressible foam material (open or closed cell) having sufficient rigidity to provide the necessary strength, shape and sealing to the corners of the supplemental window. The band 192 may comprise a material that has air flow inhibition properties such as pile, foam or an elastomer such as silicone, and sealing properties such as an oil, grease, gel, etc. In addition, it may comprise a material that is sufficiently tacky to hold the corner brace in its proper position. Such a material may comprise, gel, releasable adhesive, glue, etc. In addition, the band may comprise a material having both sealing and tacky properties. Band 192 preferably extends over the brace midline at the brace corner so as to inhibit air movement between the enclosed space and the air outside the enclosed space when the supplemental window is mounted.

Figure 7D:
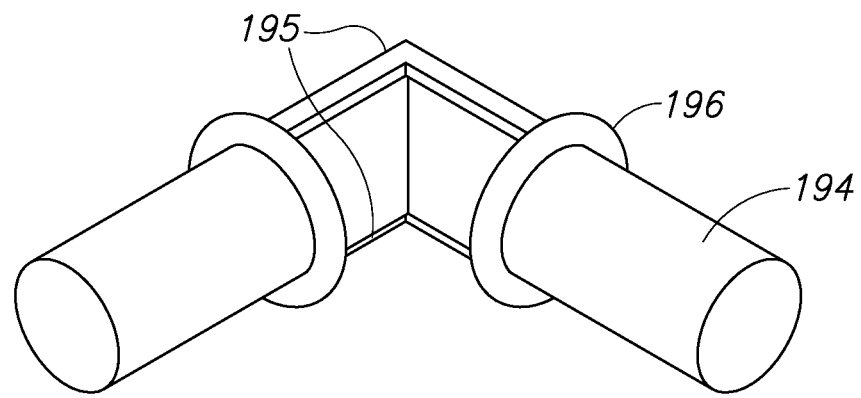
FIG. 7D is a diagram illustrating a fourth example of the corner sealing mechanism.

A diagram illustrating a fourth example of the corner sealing mechanism is shown in FIG. 7D. This fourth example corner sealing mechanism comprises a substantially impermeable corner brace 194 having one or more O-rings 196 and strips 195 on each arm of corner brace 194 each made of a suitable material. The corner brace may take any appropriate chase such as cylindrical, rectangular, square, elliptical, etc. It may comprise a solid plastic or a compressible foam material (open or closed cell) having sufficient rigidity to provide the necessary strength to the corners of the supplemental window. The O-rings may be constructed from elastomer, plastic, pile, foam or any other suitable material as long as it provides sufficient sealing properties. The strips of material 195 are preferably located on the top (sheet side) and bottom (pane side) portions of the corner brace 194. The strips 195 may comprise any material having appropriate sealing properties such as elastomer (such as silicone), plastic, pile, foam, felt etc. In addition, it may comprise a material that is sufficiently tacky to hold the corner brace in its proper position. Such a material may comprise, gel, releasable adhesive, glue, etc.

Figure 7E:
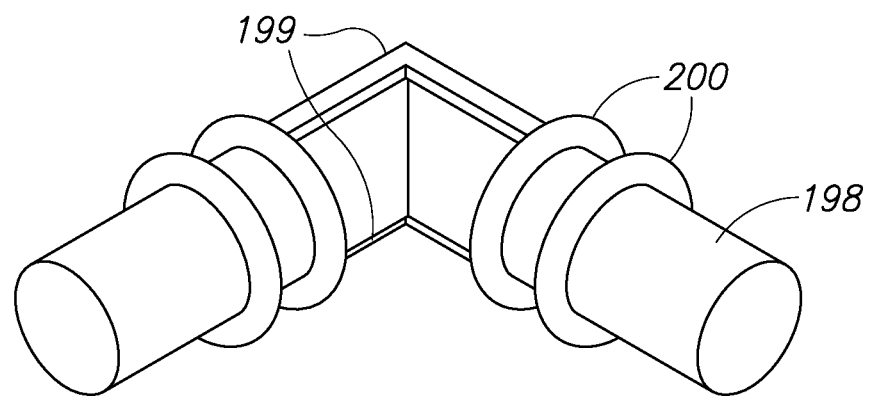
FIG. 7E is a diagram illustrating a fifth example of the corner sealing mechanism.

A diagram illustrating a fifth example of the corner sealing mechanism is shown in FIG. 7E. This fifth example corner sealing mechanism comprises a substantially impermeable corner brace 198 having two or more O-rings 200 on each arm of the corner brace and strips 199 each made of a suitable material as described supra. The corner brace may take any appropriate shape such as cylindrical, rectangular, square, elliptical, etc. It may comprise a compressible foam material (open or closed cell) having sufficient rigidity to provide the necessary strength to the corners of the supplemental window. The double O-rings 200 on each arm of the corner brace provide additional sealing abilities and may be constructed from elastomer (such as silicone), plastic, pile, or any other suitable material as long as it provides sufficient sealing properties. The strips of material 199 are preferably located on the top (sheet side) and bottom (pane side) portions of the corner brace 198. The strips 199 may comprise any material having appropriate sealing properties such as elastomer, plastic, pile, foam, felt, etc. In addition, it may comprise a material that is sufficiently tacky to hold the corner brace in its proper position. Such a material may comprise, gel, releasable adhesive, glue, etc.

Several options for the attachment mechanism for embodiments where the attachment mechanism pierces the sheet material will now be described. Note that the holes in the sheet may be made using any suitable means such as a hole punch or laser or ultrasonic cutting. In addition, the supplemental window may comprise attachments means anywhere along its perimeter and not just in the corners, e.g., along the sides, etc.

Figure 8A:
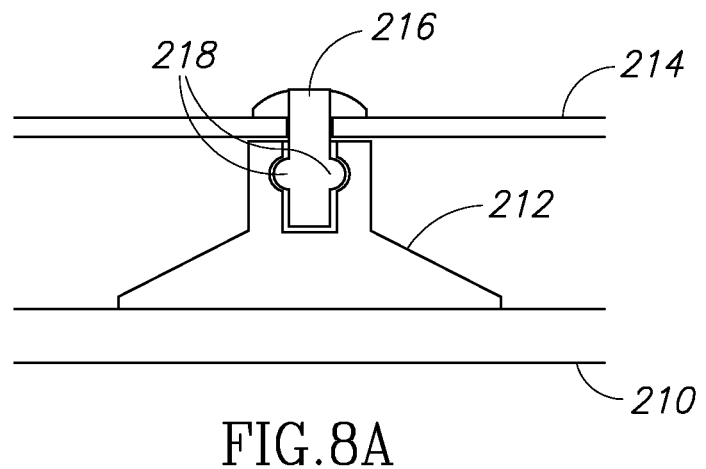
FIG. 8A is a diagram illustrating a first example of the attachment mechanism that pierces the sheet material.

A diagram illustrating a first example of the attachment mechanism that penetrates or pierces the sheet material is shown in FIG. 8A. In this first attachment mechanism example the suction cup 212 is fastened to the sheet material 214 via a post 216 having dimples, a ring, tab or barbs 218 that fit into a corresponding recess in the head of the suction cup 212. The post 216 pierces the sheet and is operative to snap into top portion of the suction cup. The suction cup is attached to the window pane 210 when the supplemental window is installed. Note that the length of the post 216 can vary according to the dimensions of the suction cup used and the desired distance between the sheet and the pane. The combination of the post (when in an installed position) and the compressed suction cup determine the distance between sheet and pane.

Figure 8B:
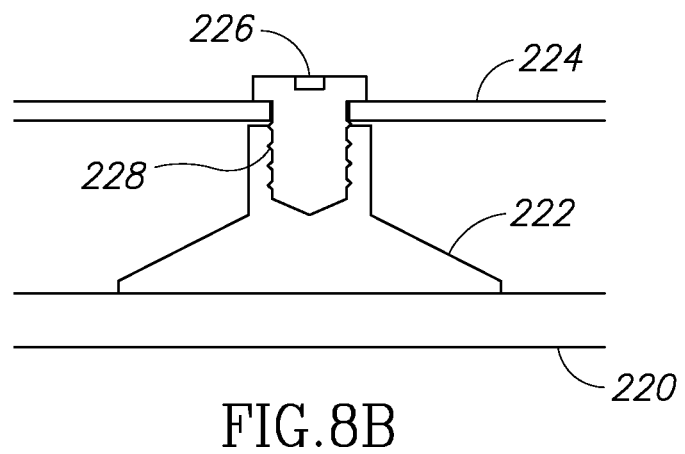
FIG. 8B is a diagram illustrating a second example of the attachment mechanism that pierces the sheet material.

FIG. 8B is a diagram illustrating a second example of the attachment mechanism that penetrates or pierces the sheet material is shown in FIG. 8B. In this second attachment mechanism example the suction cup 222 is fastened to the sheet material 224 via a screw 226 having threads 228 that mate into a corresponding threaded receptacle in the head of the suction cup 222. Alternatively, the threads of screw 226 may cut into the material within a recess of the suction cup head. The screw 226 pierces the sheet and is operative to screw into top portion of the suction cup. The suction cup is attached to the window pane 220 when the supplemental window is installed. Note that the length of the screw 226 can vary according to the dimensions of the suction cup used and the desired distance between the sheet and the pane. The combination of the screw (when in an installed position) and the compressed suction cup determine the distance between sheet and pane.

Figure 8C:
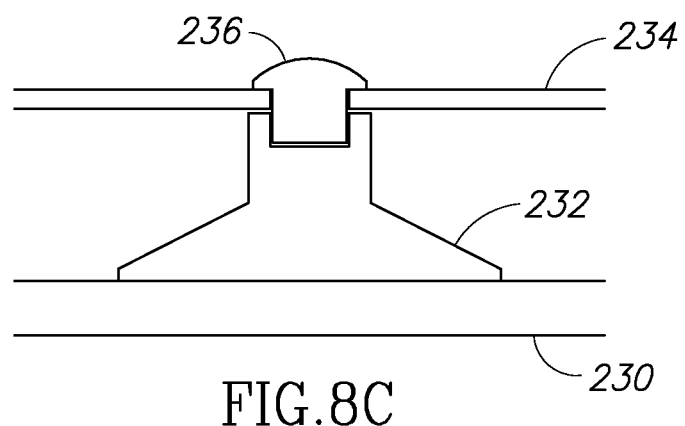
FIG. 8C is a diagram illustrating a third example of the attachment mechanism that pierces the sheet material.

A diagram illustrating a third example of the attachment mechanism that penetrates or pierces the sheet material is shown in FIG. 8C. In this third attachment mechanism example the suction cup 232 is fastened to the sheet material 234 via a rivet or cap 236 having that is friction fit and held in place when inserted into a corresponding recess in the head of the suction cup 230. The cap 236 pierces the sheet and is operative to fit into top portion of the suction cup. Alternatively or in addition, a barb or tab (not shown) may be provided on the cap 236 that fits into corresponding recess on the suction cup to guide and/or secure the placement of the cap. The suction cup is attached to the window pane 230 when the supplemental window is installed. Note that the length of the cap 236 can vary according to the dimensions of the suction cup used and the desired distance between the sheet and the pane. The combination of the cap (when in an installed position) and the compressed suction cup determine the distance between sheet and pane.

Figure 9A:
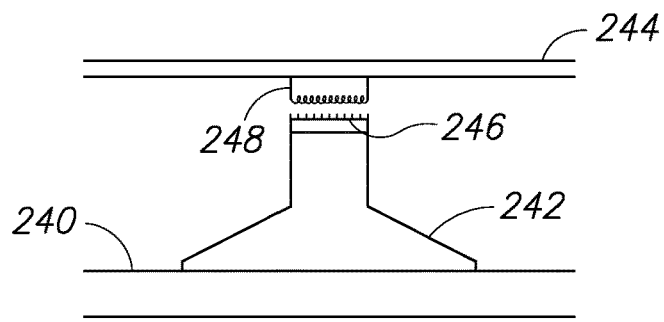
FIG. 9A is a diagram illustrating a first example of the attachment mechanism that does not pierce the sheet material.

Several options for the attachment mechanism for embodiments where the attachment mechanism does not pierce the sheet material will now be described. A diagram illustrating a first example of the attachment mechanism that does not pierce the sheet material is shown in FIG. 9A. In this first example, the suction cup 242 is fastened to the sheet 244 using a hook and loop fastener, such as Velcro. One side 248 of the Velcro (hook or loop) is attached to the sheet using adhesive, tape, glue, etc. while the other side 246 is attached to the top of the suction cup (e.g., a post portion). In this manner, the attachment mechanism is operative to both attach to the window pane 240 but also determine the distance between the sheet and pane.

Figure 9B:
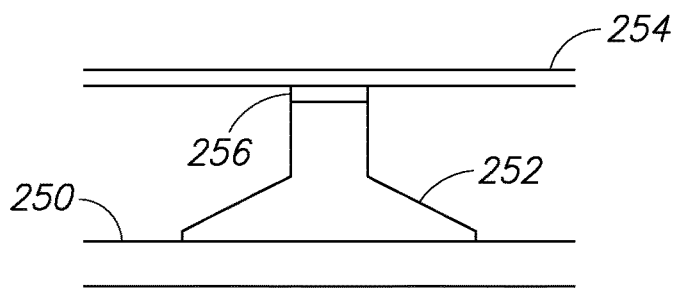
FIG. 9B is a diagram illustrating a second example of the attachment mechanism that does not pierce the sheet material.

A diagram illustrating a second example of the attachment mechanism that does not pierce the sheet material is shown in FIG. 9B. In this second example, the suction cup 252 is fastened to the sheet 254 using adhesive, glue, tape, welding, or any other suitable bonding technique. In this manner, the attachment mechanism is operative to both attach to the window pane 250 but also determine the distance between the sheet and pane.

Figure 9C:
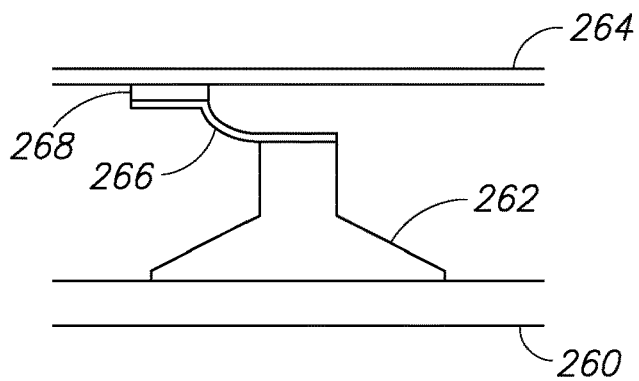
FIG. 9C is a diagram illustrating a third example of the attachment mechanism that does not pierce the sheet material.

A diagram illustrating a third example of the attachment mechanism that does not pierce the sheet material is shown in FIG. 9C. In this third example, the suction cup 262 is fastened to the sheet 264 using a commercially available dry adhesive material 268 such as EverSTIK, Geckskin™, etc. or other dry adhesive such as described in U.S. Pat. Nos. 8,206,631; 8,398,909; and U.S. Publications Nos. 2012/0319320; 2012/0328822; and 2013/0251937 and described at www.nanogriptech.com. Depending on the material used, an arm 266 may be required to attach the suction cup 262 to the material 268. In this manner, the attachment mechanism is operative to both attach to the window pane 260 but also determine the distance between the sheet and pane.

In an alternative embodiment, supplemental window's spacing arrangement (e.g., suction cup) may be attached using a releasable, dry surface-adhesive device including, for example, an adhesive pad that may have a tether component attached, the adhesive pad including a planar backing layer having high in-plane stiffness and a planar layer of elastic material having an adhesive surface on at least one side for adhering to the pane, wherein the elastic material is impregnated onto the backing layer on at least the side opposing the adhesive surface, as described in WO 2012/078249, WO 2014/152485, WO 2014/123936 and WO 2014/144136, incorporated herein by reference in their entirety.

When using a releasable, surface-adhesive device, the elastic material preferably comprises a siloxane-based, such as polydimethylsiloxane, urethane-based, or acrylate-based elastomer. Such attachment by adhesive, vacuum or releasable, surface-adhesive device may be made to the interior or exterior surface of the pane. When using suction cups, attachment of the suction cup to the window pane may include use of an additional material between the suction cup and the pane. For example, water, saltwater, saliva, or other water based solution, such as liquid soap or dishwashing soap or solution may be used. Preferred materials include vegetable or cooking oil such as canola, sunflower or corn oil, petroleum jelly, or a grease, such as a petroleum or silicone grease based grease, e.g., polydimethylsiloxane.

Figure 9D:
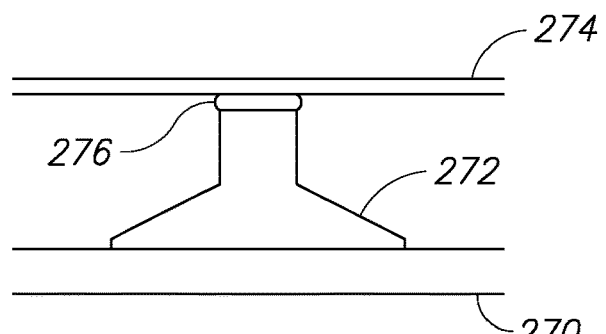
FIG. 9D is a diagram illustrating a fourth example of the attachment mechanism that does not pierce the sheet material.

A diagram illustrating a fourth example of the attachment mechanism that does not pierce the sheet material is shown in FIG. 9D. In this fourth example, the suction cup 272 is fastened to the sheet 274 using any suitable well-known welding technique. In this manner, the attachment mechanism welded 276 to the sheet is operative to both attach to the window pane 270 but also determine the distance between the sheet and pane.

Figure 10A:
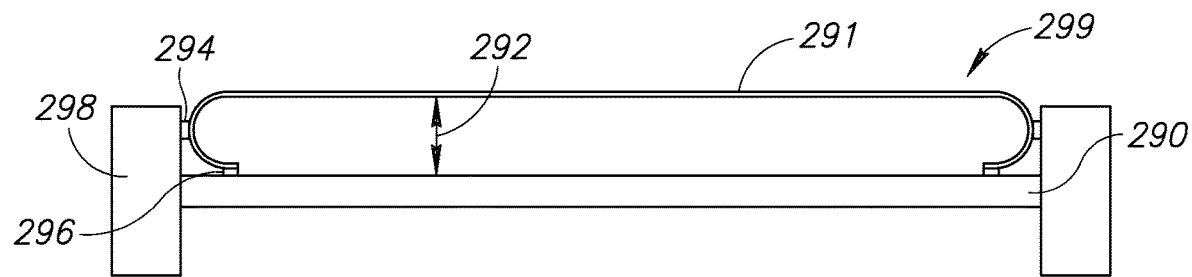
FIG. 10A is a diagram illustrating a side sectional view of an example frameless supplemental window.

A diagram illustrating a side sectional view of an example frameless supplemental window is shown in FIG. 10A. In this example embodiment, the supplemental window 299 does not have corner braces. It is similar to the frameless and braceless embodiment shown in FIG. 4C described supra.

The sheet material 291 can be separate from but bonded to the bullnose edge seal or they may be constructed from the same material as a single entity. In this case, they comprise the same material and may be the same thickness. The bullnose edge can be formed by thermoforming, i.e. wrapping the edges around a mold or form and heat treating the material such that the material retains an approximate 'C' or arc shape after the heat source is removed. Alternatively, the edge may be stretched, and optionally cut, such that the edge portion of the single entity is thinner than the sheet portion. Further, it will be appreciated by those skilled in the art that the edging seal may be curved in the opposite direction shown so that such edging seal may contact the inward facing surface or the interior facing surface of the frame or sash. In such cases, dry adhesive materials described supra, for example, may be used to seal the edging seal to the frame or sash while using spacing attachment means such as those described in FIGS. 8A, 8B, 8C and 9A, 9B, 9C, 9D to provide attachment to and desired spacing from the pane for the sheet.

In the embodiment shown in FIG. 10A, the corners of the bullnose edge are mitered and bonded using any suitable means, such as gluing, taping, heat welding, ultrasonic welding, laser welding, stapling, etc. Regardless of the actual mechanism or method used to form or join the mitered corners, it is important that the bond be substantially air tight so as to prevent leaks of air into or out of the trapped air layer 292.

The bottom portion (the portion near window pane 290) of the bullnose edge comprises a strip 296 of sealing material substantially along the entire perimeter formed by this portion of the bullnose edge. This sealing material may comprise any suitable material such as an oil coating, grease coating, gel, dry adhesive or nanosuction adhesive material, foam, elastomer, etc. Preferably, the properties of the sealing material are sufficient to provide functions of both (1) sealing the trapped air layer; and (2) affixing (i.e. attaching) the supplemental window to the window pane 290. These functions may be achieved by a single strip 296 of material placed at the bottom (near the pane 290) of the bullnose edge or a single strip 294 of material placed at the bullnose edge contacting window frame or sash 298. Alternatively, they may be achieved utilizing two separate strips of materials: (1) a first strip 296 on the bottom of the bullnose edge for sealing the trapped air layer; and (2) a second strip 294 on the side of the bullnose edge for attaching the supplemental window to the window frame 298. Alternatively, the functions of the strips in this embodiment may be reversed with the strip on the side of the bullnose providing sealing and the strip on the bottom of the bullnose edge providing adhesion to the window pane. In the embodiment of FIG. 10A, the bullnose edge seal along edges or at corners such as in FIG. 11A infra may provide the desired sheet to pane spacing.

Figure 10B:
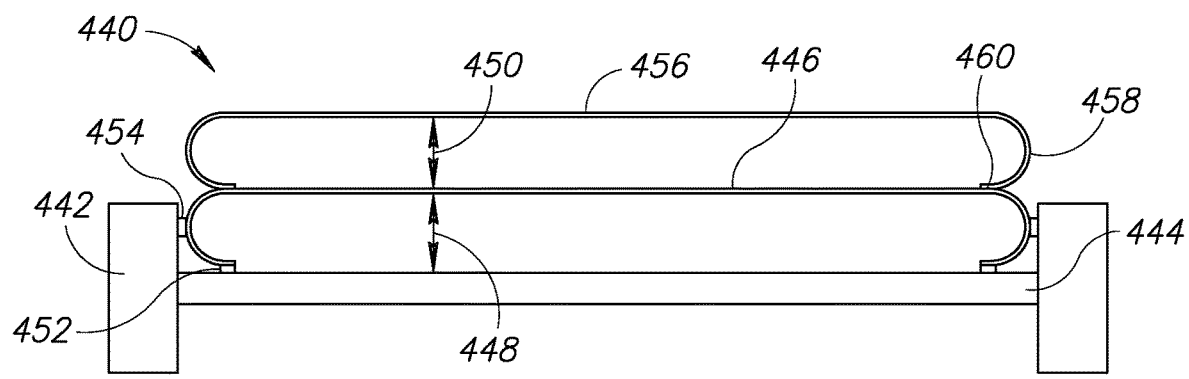
FIG. 10B is a diagram illustrating a side sectional view of an example frameless supplemental window incorporating two trapped air layers.

A diagram illustrating a side sectional view of an example frameless supplemental window incorporating two trapped air layers is shown in FIG. 10B. In the multi-sheet embodiment, generally referenced 440, a second sheet 456 is added over the first sheet 446. The dimensions of the second substantially enclosed space 450 provided in this embodiment are approximately the same as the dimensions provided by the first substantially enclosed space 448 between the first sheet 446 and the window pane 444 described supra. The first sheet 446 is attached to the pane 444 using techniques described in detail supra. For example, strip 452 may function to seal or attach the supplemental window to the pane or may perform both functions of sealing and attaching. Similarly, strip 454 may function to seal or attach the supplemental window to the pane or may perform both functions of sealing and attaching.

Figure 11A:
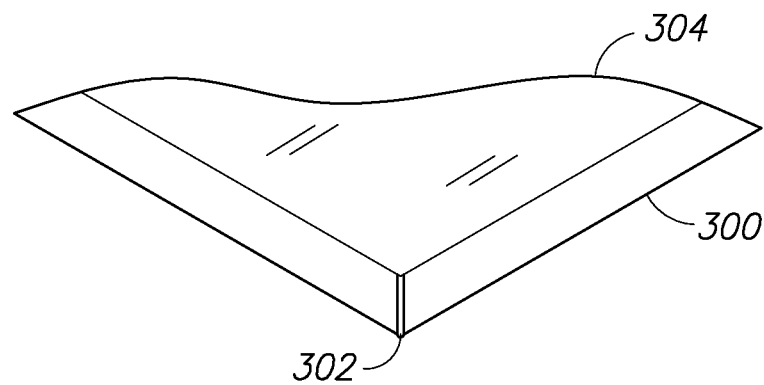
FIG. 11A is a diagram illustrating a perspective view of a first example bullnose corner.

The spacing between the first and second sheets may be achieved, for example, using a post through both sheets (not shown) with nuts on both sides of the first sheet, a seal, such as a bullnose seal (which may include a corner seal closure, not shown, such as shown in FIG. 11A infra) sized and having necessary stiffness to provide the desired spacing and attached to both sheets for edges and/or a brace at the corner of each level. For panes having edge dimensions of greater than about 15 inches, it is beneficial to provide one or more additional spacing posts or braces along the edges of the enclosed spaces of this embodiment. Alternatively, as in the embodiment of FIG. 10A, the bullnose 458 may substantially determine the spacing between the first and second sheets.

The second cavity 450, between the first and second sheets, may be permanently formed by mitering and welding edging 460 as described supra and welding, adhering or otherwise bonding the edging 458 to both sheets. Attachment to the pane 444 may be accomplished by means described supra. Optionally, a single post through both sheets in each of the corners may be provided with suction cup attachment to the pane. Alternatively, the second cavity may be releasably formed using non-permanent adhesive 460 as described supra between the second seal 458 and the first sheet 446 or portion of the first seal 459 that is approximately parallel to and nearest first sheet 446. Other means for attaching the second sheet to the first sheet include a first bolt (not shown) with a tap or other attachment mechanism for a second bolt or bolts, threaded rod, nut and tapped cylinder/spacer between the first and second sheets and one or more bolts.

With the seals attached inward from the edge of each sheet, rigid clip spacers may be added at several perimeter locations to maintain sheet to sheet spacing in multi-sheet embodiments. The corners may be mitered and welded or adhesively closed to entirely enclose the second cavity 450 when attached to a first sheet.

Several options for the bullnose corner will now be described. A diagram illustrating a perspective view of a first example bullnose corner is shown in FIG. 11 A. In this first example, the bullnose edge 300 is either attached to sheet 304 perimeter region or formed as an extension of the sheet 304 perimeter region. The corner portion of the bullnose is cut such that when the bullnose is shaped, a miter 302 is formed that is bonded using any suitable means, such as glue, adhesive, welding, tape etc. In this case, the bonding of the miter forms a substantially air tight seal and may be constructed to provide the desired sheet to pane spacing.

Figure 11B:
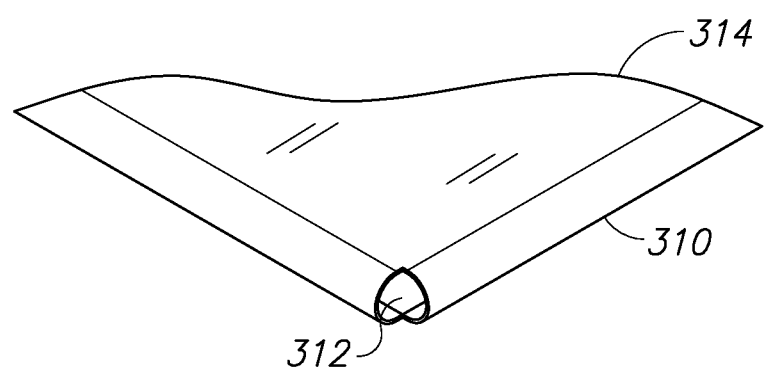
FIG. 11B is a diagram illustrating a perspective view of a second example bullnose corner.

A diagram illustrating a perspective view of a second example bullnose corner is shown in FIG. 11B. In this second example, the bullnose edge 310 is either attached to or formed from an extension of the sheet 314 perimeter region. The corner portion of the bullnose is cut such that when the bullnose is shaped, an approximately 90 degree junction 312 is formed by the bottom portions of the edge material near the pane. Alternatively, the bottom corners of the edge material may be cut so they do not form a junction (not shown). The opening formed in the corner is sealed by placing a corner brace with suitable sealing into the corner.

Figure 11C:
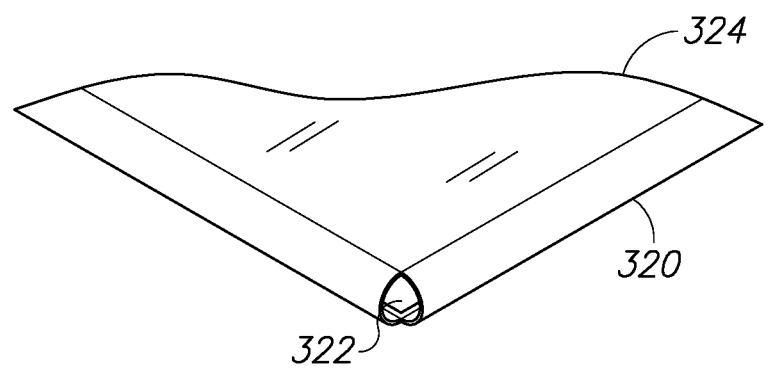
FIG. 11C is a diagram illustrating a perspective view of a third example bullnose corner.

A diagram illustrating a perspective view of a third example bullnose corner is shown in FIG. 11C. In this third example, the bullnose edge 320 is either attached to or formed from an extension of the sheet 324 perimeter region. The corner portion of the bullnose is cut such that when the bullnose is shaped, an approximately 90 degree junction 322 is formed whereby the bottom portions of the bullnose material are allowed to overlap onto each other. The opening formed in the corner is sealed by placing a corner brace with suitable sealing into the corner.

Figure 11D:
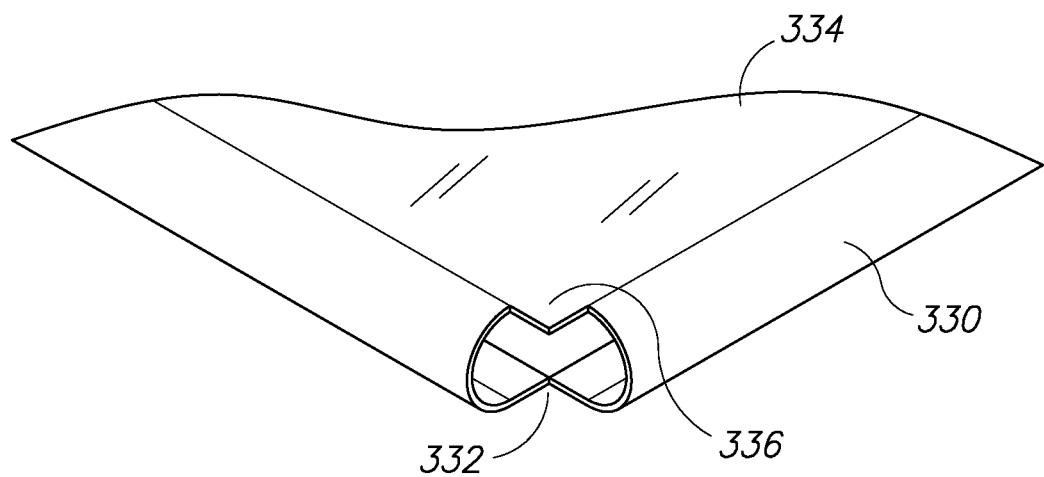
FIG. 11D is a diagram illustrating a perspective view of a fourth example bullnose corner.

A diagram illustrating a perspective view of a fourth example bullnose corner is shown in FIG. 11D. In this fourth example, the bullnose edge 330 is either attached to or formed from an extension of the sheet 334 perimeter region. The corner portion of the bullnose is cut such that when the bullnose is shaped, an approximately 90 degree junction 332 is formed whereby a squared off portion 336 of the corner the sheet material extends outward of junction 332. Note that the alternative configurations to an approximately 90 degree junction described supra may also be used in this sheet corner outward extension embodiment. The extended sheet material provides a portion of the corner closure when used in conjunction with corner braces shown in FIGS. 7A, 7B, 7C, 7D and 7E. Alternatively, a similar extending material portion may be formed by appropriate cutting of the top portion (the portion near the sheet) of the bullnose edges shown in FIGS. 11B and 11C. The opening formed in the corner is sealed by placing a corner brace with suitable sealing into the corner.

Figure 11E:
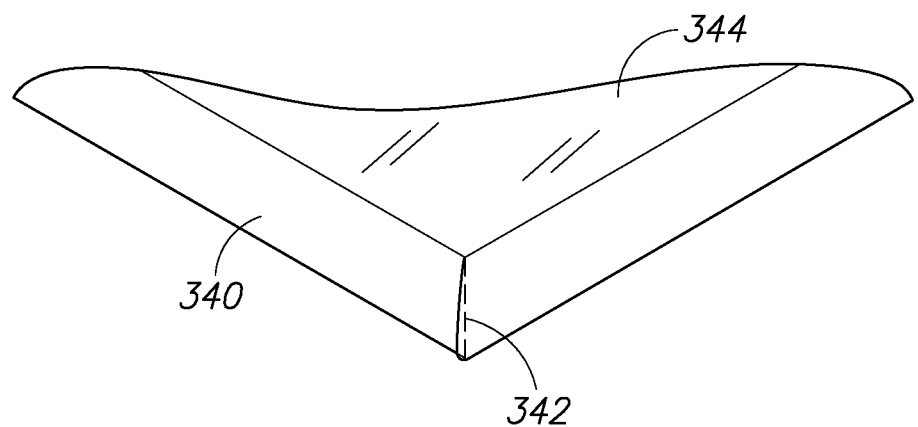
FIG. 11E is a diagram illustrating a perspective view of a fifth example bullnose corner.

A diagram illustrating a perspective view of a fifth example bullnose corner is shown in FIG. 11E. In this fifth example, the bullnose edge 340 is either attached to or formed from an extension of the sheet 344 perimeter region. The corner portion of the bullnose is cut such that when the bullnose is shaped, an overlapping miter 342 is formed with grease applied to aid in sealing. The mitered edges of the bullnose, however, are not bonded to each other, but rather simply abut each other. Any air leakage is sealed utilizing a corner brace with suitable sealing placed into the corner.

Figure 12A:
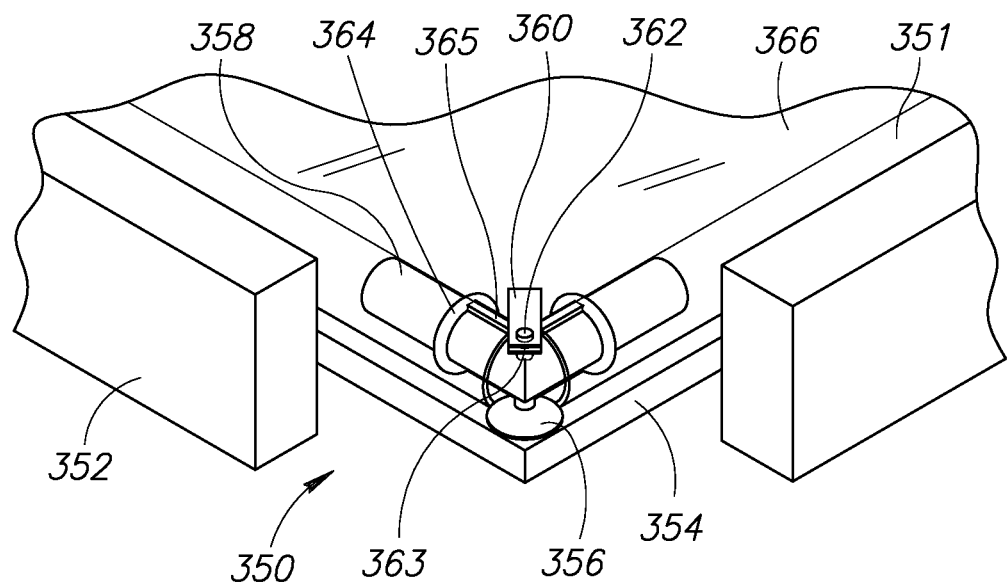
FIG. 12A is a diagram illustrating a perspective view of another embodiment of the frameless supplemental window.

A diagram illustrating a perspective view of another embodiment of the frameless supplemental window is shown in FIG. 12A. The window corner, generally referenced 350, comprises a window frame or sash 352 (shown cutaway for clarity), window pane 354, corner brace 358, seal 364 comprising O-rings, O-ring cord, pile, foam, etc., sheet material 366, post 362, suction cup 356 and one or more constraints 360. This embodiment consists of a sheet 366 and bullnose edge seal 351 that is open at each corner. The corner is sealed with the corner brace 358 having a pile or O-ring cord strip 364 on both the pane and sheet sides of the corner brace. In addition, each arm of the brace has a seal comprising a ring of pile or elastomer 364. Through the corner of the corner brace is a post 362 that is held in place using a suction cup 356 or other means described supra that attaches to the pane 354. At the sheet end of the post is a first constraint 360 that functions to press against the sheet preventing the sheet from separating from the pane (thus defining the pane sheet separation) and seals. Optionally, a second constraint 363 may be placed on the post so as to sandwich the sheet thus forming a slot and also defining the pane to sheet separation distance.

Figure 12B:
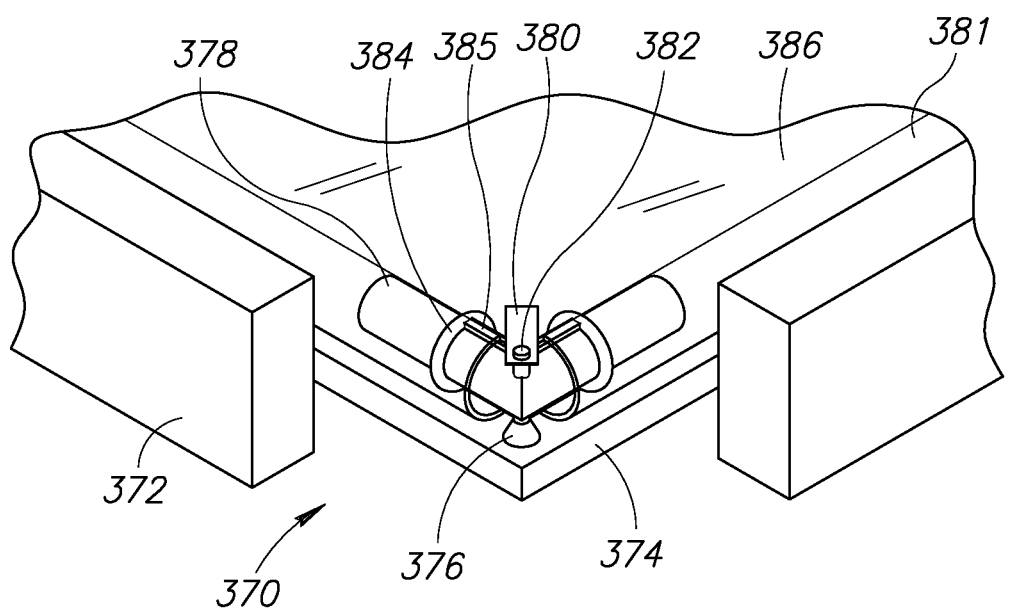
FIG. 12B is a diagram illustrating a perspective view of an additional embodiment of the frameless supplemental window.

A diagram illustrating a perspective view of an additional embodiment of the frameless supplemental window is shown in FIG. 12B. The window corner, generally referenced 370, comprises a window frame 372 (shown cutaway for clarity), window pane 374, corner brace 378, seal 384 comprising O-rings, pile, etc., sheet material 386, post 382, attachment means 376 and one or more constraints 380. This embodiment consists of a sheet 386 and bullnose edge seal 381 that is open at each corner. The corner is sealed with the corner brace 378 having a pile or elastomer cord strip 384 on both the pane and sheet sides of the corner brace. In addition, each arm of the brace has a ring of pile or elastomer 384. Through the corner of the corner brace is a post 382 that is held in place against the pane using glue, double sided tape, adhesive, dry adhesive materials, including nanosuction material such as EverSTIK material, Geckskin™, nanoGriptech materials as described at www.nanogriptech.com, etc. At the sheet end of the post is a first constraint 380 that functions to press against the sheet preventing the sheet from separating from the pane. Optionally, a second constraint (not shown) may be placed on the post so as to sandwich the sheet thus forming a slot and also defining the pane to sheet separation distance.

Figure 12C:
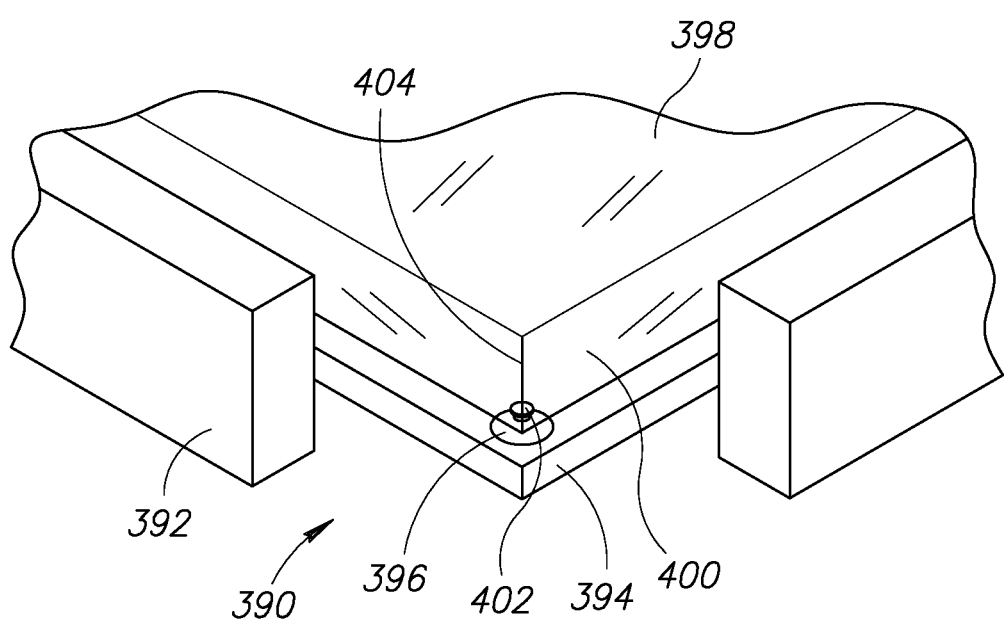
FIG. 12C is a diagram illustrating a perspective view of another embodiment of the frameless supplemental window.

A diagram illustrating a perspective view of another embodiment of the frameless supplemental window is shown in FIG. 12C. The window corner, generally referenced 390, comprises a window frame or sash 392 (shown cutaway for clarity), window pane 394, sheet material 398, bullnose edge seal 400 and attachment means 396. This embodiment consists of a sheet and bullnose edge seal as well as an attachment means comprising a suction cup, fastened through a hole in the mitered corner portion of the bottom (nearest the pane) of the bullnose, with a protruding mushroom cap.

The bullnose 400 may comprise a single continuous strip or two or more strips. At the corner, the bullnose edge is preferably mitered and may comprise a single continuous piece of material or may comprise more than one piece of material for the perimeter. To complete the substantial enclosure, ends and mitered portions of the compressible bullnose edge material may be overlapped, abutted or joined, preferably using adhesive, welding or heat sealing. Note that when the edge is comprised of one piece, the ends of the piece may be joined at a corner, in which case the ends of the piece are mitered, or the ends of the piece may be joined along a perimeter edge, in which case the ends of the piece may be cut so as to abut or slightly overlap to enable joining by methods described supra.

Attachment to the pane is achieved utilizing any of the attachment means described supra on the pane side surface of the bullnose. As a non-limiting example, shown in FIG. 12C is a suction cup 396 with a mushroom cap 402 with the suction cup on the pane side of the bullnose edge seal near the window pane. The mushroom cap is held in a hole in the bullnose with the mushroom cap on the opposite side of the hole from the compressible portion of the suction cup. Optionally, a washer comprising foam or an elastomer may be used between the mushroom cap and bullnose edge seal 400. Optionally, a portion of compressed circumference of the suction cup may reside inward from the bullnose edge seal to pane contact region. In such cases, a foam sheet such as open cell foam, pile or other suitable sealing material may be placed between the sealing portion of the suction cup and the bullnose edging to ensure inhibition of air movement into or out of the enclosed space when the suction cup is compressed.

Optionally, a post may be attached to the suction cup. The length of the post may be such that when it is attached to the suction cup, it nearly touches the sheet. The post may be depressed by the end user by pressing on the sheet immediately adjacent to the end of the post during mounting to provide a force on the suction cup which leads to compression of the suction cup and its attachment to the pane.

Optionally, the top of the suction cup or an extension from the suction cup may comprise magnetic material or a ring magnet (preferably constrained by a post through its center) that may be repelled by a magnet held by the end user external to the space to be enclosed, such that pressure is applied to the top of the suction cup which leads to its attachment to the pane. Similarly, when strips of dry adhesive material described supra are used for attachment, such strips may comprise magnetic material to enable additional pressure to be applied to the attachment regions during mounting by a magnet held by the end user.

Each corner of the bullnose edge is mitered 404 and sealed on both the sheet side and the pane side. The bullnose may optionally be thermoformed to form an arc. Sealing of the miters may be accomplished using any suitable technique, such as but not limited to, adhesive, adhesive tape or preferably welded. Similarly, when using a single continuous strip, which may be notched (at locations that substantially match the corner to corner dimensions of the sheet material) to form miters, the ends of the strip may be joined using adhesive, adhesive tape, welded or any other suitable bonding technique. Further, when using a suction cup, the region between the suction cup top surface and the pane side of the bullnose edge may be filled with a foam sheet, for example open or closed cell foam, pile or other suitable sealing material to aid in maintaining the enclosure integrity.

Figure 13A:
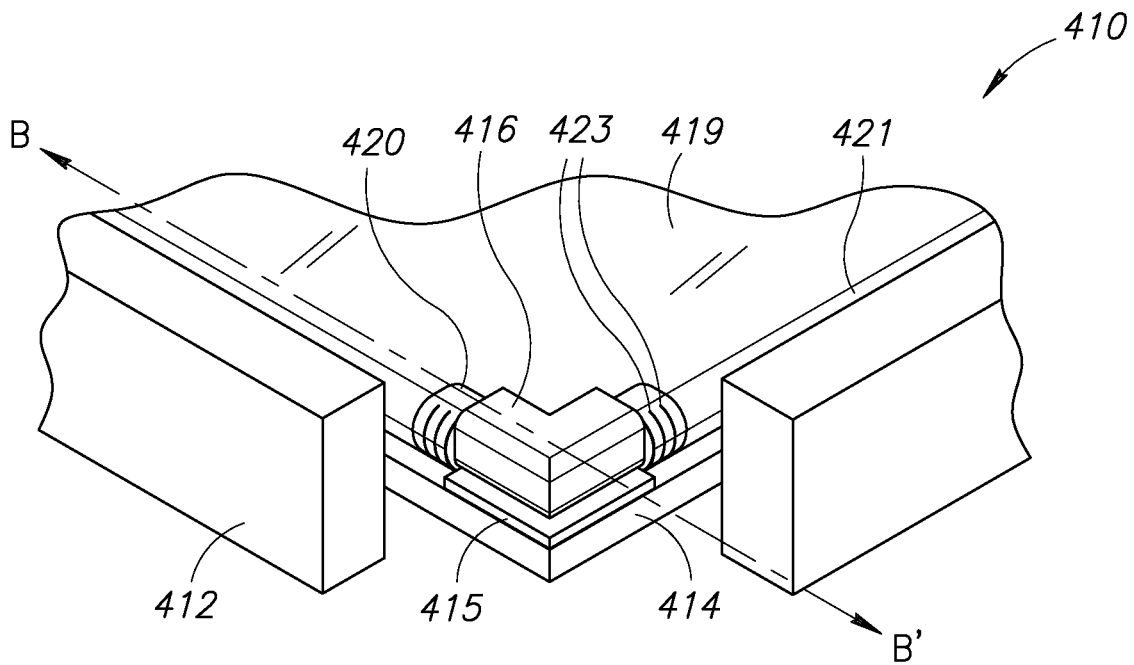
FIG. 13A is a diagram illustrating a perspective view of an additional embodiment of the frameless supplemental window.
Figure 13B:
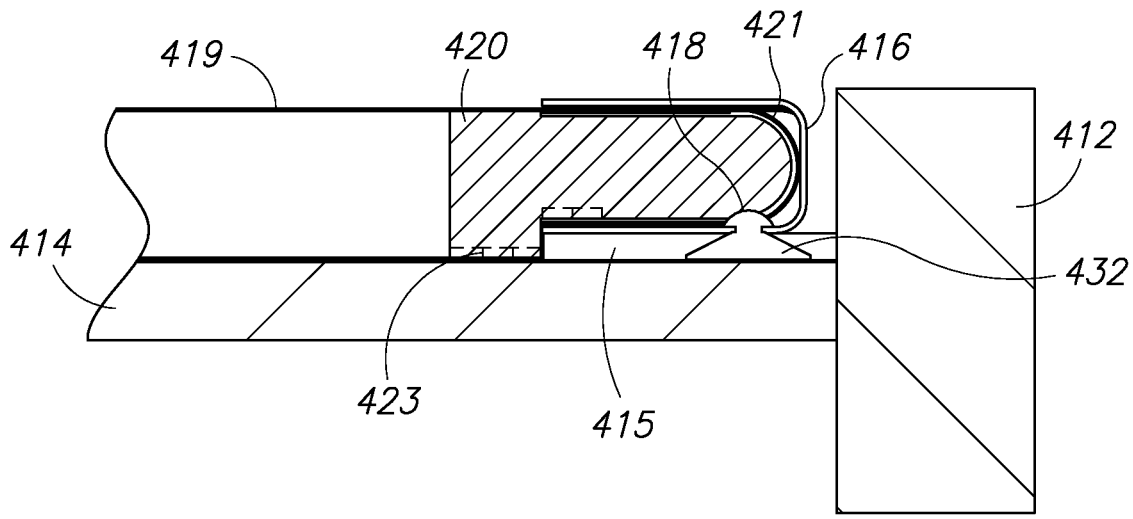
FIG. 13B is a diagram illustrating a side sectional view B-B' of the example window of FIG. 13 A.
Figure 13C:
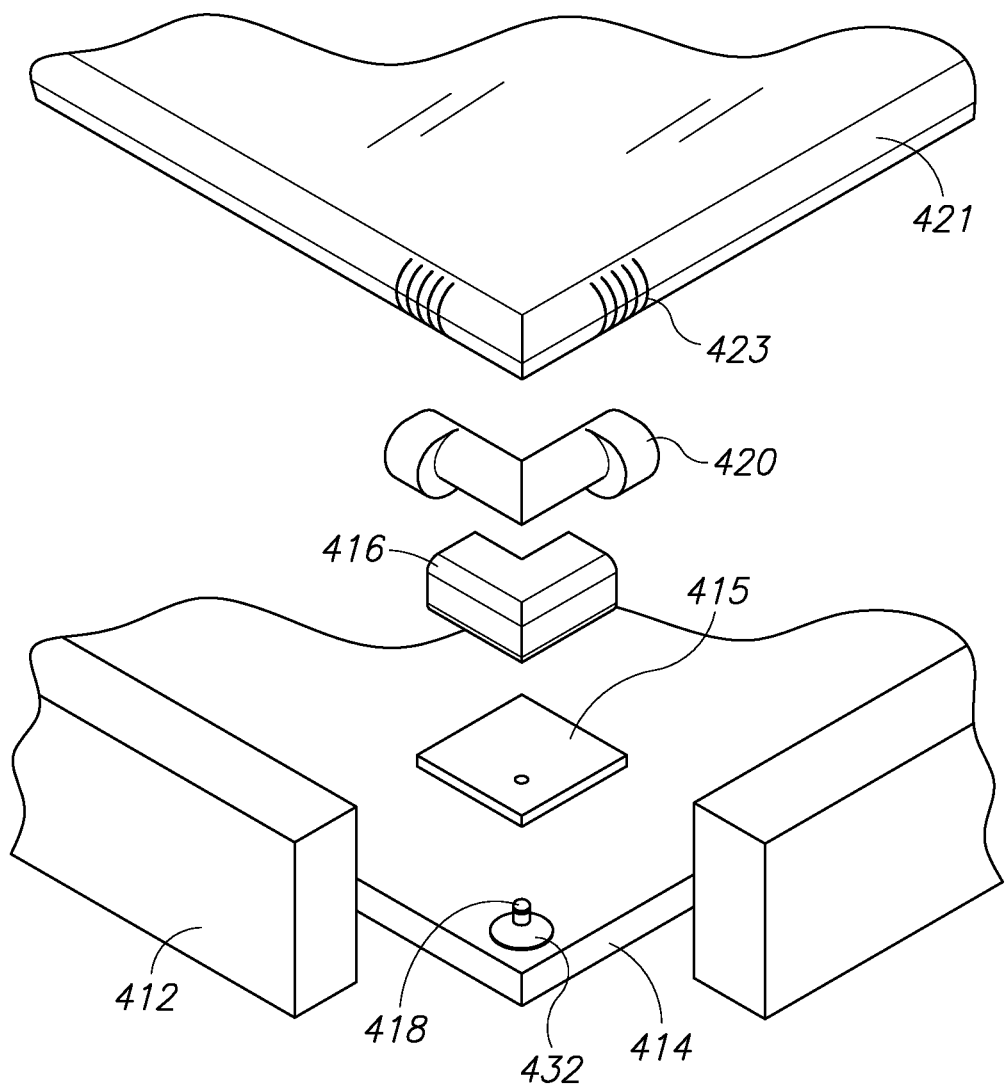
FIG. 13C is a diagram illustrating an exploded view of the example window of FIG. 13 A.

A diagram illustrating a perspective view of an additional embodiment of the frameless supplemental window is shown in FIG. 13A. A diagram illustrating a side sectional view B-B' of the example window of FIG. 13A is shown in FIG. 13B. A diagram illustrating an exploded view of the example window of FIG. 13A is shown in FIG. 13C. The window corner, generally referenced 410, comprises a window frame or sash 412 (shown cutaway for clarity), window pane 414, constraint 416, sheet 419, insert 420, optional sheet portion 415, mushroom cap 418, suction cup 432 and bullnose edge seal 421 having one or more slits 423.

This embodiment consists of a sheet and bullnose edge seal held at each corner using a support mechanism consisting of a constraint 416 and foam insert 420 with the constraint attached to the window pane 414 via one of the suitable pane attachment mechanisms described supra, for example, such as suction cup 432. In one example embodiment, the pane attachment means comprises a suction cup 432 connected to the base of the constraint 416 through a hole that engages the mushroom cap 418 of the suction cup 432. The constraint 416 is positioned so as to constrain the separation between the pane 414 and the sheet 419 and thus determine the distance between them. Preferably, the bullnose edge corner fits into the corner support mechanism, (i.e. the constraint 416) and is optionally friction fit in the support using a foam insert 420. Preferably, the bullnose edge seal includes multiple slits 423 to each side of the edge of the support so that the step from the constraint 416 to the pane 414 may be substantially closed. Such closure is aided by use of an insert 420 in the bullnose edge seal in this location. Insert 420 may be sized and shaped to conform to the step from constraint 416 to pane 414. As such, insert 420 may be constructed from a solid rigid material or a conformable foam material. The gap between the suction cup and bottom of the constraint may optionally be filled with a sheet 415 such as foam, pile or other suitable sealing material. Similarly, slits such as those just described and as described in U.S. application Ser. No. 14/315,503 cited supra may be used in the edging seal in the region where the edging seal crosses any protruding muntins that may be present on the window pane.

In each embodiment described supra, in addition to the attachment mechanisms described for mounting, a safety feature (e.g., a clip) attaching to a portion of the window not used for mounting (e.g., a frame, a sash or a protruding muntin) may be included. When provided, the safety feature is in mechanical communication with the frameless supplemental window such that in case of failure of the various attachment mechanisms described supra, the safety feature inhibits the frameless supplemental window from falling away from the fenestration.

Note that corner braces and constraints can be fabricated, for example, by injection molding or three-dimensional printing methods. As part of extrusion for fabricating the sheet and edging parts, injection molding or 3D printing operations for fabricating corner braces and constraints, printing, embossing or other means of part identification, material type and recyclability, installation instructions and mating indicators may be imparted on each such part. Other aspects of fabrication may include the chopping, cutting or slitting of materials, application of adhesives and associated protective covers for applied adhesives and packaging material. Formation of the sheet, edge seal and other supplemental window parts described supra into a custom supplemental window during fabrication may be performed to minimize installation complexity. Such formation may be by adhesive, or preferably welding, heat sealing, mechanically, etc. to aid in end-of-life recycling or reuse of the materials.

When an end user no longer wishes to use the custom supplemental parts, for example due to moving to a different location, the custom supplemental parts may be recycled or re-used by a subsequent occupant at the location of the installation. When recycling the custom supplemental parts, such recycling may be achieved by the end user through a local recycling program, sent to a local retailer for recycling or sent to the service provider for recycling. When sent to the service provider for recycling, the custom supplemental parts may also be resold, with refurbishment or remanufacturing if necessary, to a different end user having similar, though perhaps slightly different, design requirements as the original end user. For example, the shape of a plastic sheet might be altered slightly by cutting along an edge while other components are re-used without modification.

Alternatively, the service provider may separate the custom supplemental parts from multiple end users so that such parts may be recombined in different combinations to meet the design requirements of a new end user. Another recycling route that may be used by the service provider or fabricator is to have the received parts enter a recycling stream in which the parts re-enter a manufacturing stream at a raw material stage where they are reformed into a new shape or part. The materials used for corner braces, the plastic sheet, or the edging may be chosen to optimize certain characteristics, depending on the part and end user design choices. It is preferred that the materials used for each part are chosen so that each part may be reused, recycled or remanufactured.

For use as corner braces, supports, or posts, materials having sufficient stiffness while providing the supplemental window mechanical stability are desirable. As the custom supplemental parts may be exposed to sunlight for extended periods, ultraviolet stabilizers can be added to the materials to maintain optical and mechanical properties or materials with inherent stability to ultraviolet and visible light may be chosen. Suitable materials for the plastic sheet or edging include, polyethylene terephthalate, polyethylene terephthalate glycol-modified, acrylic such as polymethylmethacrylate, polyvinyl chloride, cellulose acetate, or polycarbonate as well as ultraviolet stabilized polypropylene or polyethylene. Flexible glass may also be suitable for use as a sheet material.

Plastic materials that may be useful for one or more of the supplemental window components may include vinyl, such as polyvinyl chloride or acrylic, polyethylene, polypropylene, or polycarbonate. When polycarbonate is used, polycarbonates may include those that are made by reacting carbon dioxide with organic compounds such as epoxides.

For use as edging material, materials that are also flexible and easily bent and shaped are preferred. For example, polyethylene terephthalate may be used in a thickness range of approximately 3 mil to approximately 8 mil to allow for on site adjustment of the bullnose edging by the spring, though a larger thickness may be used if no adjustment capability is required. If transparency of the window opening is desired, materials having relatively high transparency, clarity and gloss as well as low haze are useful in the present invention. For use as spring material, polyethylene terephthalate strip and ring in a thickness range, respectively, of approximately 10 mil to approximately 60 mil and approximately 5 mil to approximately 20 mil has been found to be useful.

Additionally, the plastic sheet and/or edging may comprise other materials dispersed within it or in the form of layers. For example, a plastic sheet comprising other materials is particularly useful when emissivity, transmittance, absorptance and/or reflectance control is desired. One type of such material may be the addition of a laminate, for example a multilayer laminate comprising an infrared reflective layer and a scratch resistant layer such as those found in currently available window films. Such films may include materials such as transparent plastic that has been metalized or dyed, or may comprise ceramic (inorganic oxides such as tin oxide or indium oxide, or metal hexaboride or metal nitride or metal oxynitride or metal silicide, preferably less than 200 nm in diameter, more preferably less than 100 nm in diameter) film laminates that are applied as a thin layer to transparent sheets. Such materials may also act as a filter for reflecting most ultraviolet and/or infrared wavelengths while allowing transmission of visible light. For the purpose of laser welding, the plastic sheet or edging may comprise an infrared absorber near the joining surface of one of the parts to be welded.

Alternatively, the plastic sheet and/or edging may comprise materials that control the visible light transmitted for effecting privacy purposes. When using emissivity or reflectivity control layers or treatments, the sheet may be mounted on the interior or exterior side of the window pane to provide the surface treatment location that provides optimal energy savings. For example, during cold weather seasons, mounting a low-e or infrared reflective material to the interior of the pane is preferred, while during hot weather seasons it is preferable to mount the low-e or infrared reflective material to the exterior of the pane.

The plastic sheet may also have printing on the portion through which the window pane is visible. Such printing may include logos, decals or figures for desired aesthetic purposes, or line patterns, such as those used to inhibit bird strikes on the window. For plastic sheet parts, mechanical, optical and thermal conduction properties of the sheet may be optimized in different ways depending upon the end user product choices. When used on the In the foregoing, use of expressions such as "comprise", "include", "incorporate", "is", "are", "have", "contain" are not intended to be exclusive, namely such expressions are to be construed to allow other unspecified items also to be present. Reference to the singular is to include reference to the plural and vice versa. In the accompanying claims, numerals included within parentheses (if any) are for assisting understanding of the claims and are not intended to influence claim scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A supplemental window apparatus for mounting onto a window pane, comprising:
    a substantially non porous sheet material having an outer perimeter and a plurality of corners and edges defining a sheet area configured to substantially correspond to a perimeter area of the window pane that extends between the edges of the substantially non porous sheet material projected onto the window pane and edges of the window pane held by a sash or frame when the supplemental window apparatus is mounted on the window pane;
    a constraint configured to constrain one of the plurality of corners of the substantially non porous sheet material, the constraint coupled to an attachment mechanism that attaches the constraint to the window pane in a corner area of the window pane when the supplemental window apparatus is mounted to the window pane with the substantially non porous sheet material substantially parallel to the window pane, a portion of the constraint configured to be located outward from the outer perimeter of the sheet in a direction parallel to the sheet and away from the center of the fenestration; and
    a seal attached along each of the edges of the sheet material.

2. The apparatus according to claim 1, wherein the constraint is sized to determine a spacing between the substantially non porous sheet material and the window pane when the substantially non porous sheet material is mounted on the window pane.

3. The apparatus according to claim 1, wherein the seal extends from each of the edges of the substantially non porous sheet material and contacts an interior facing surface of the sash or the frame when the supplemental window apparatus is mounted to the window pane.

4. The apparatus according to claim 1, wherein the seal is fit into the constraint.

5. The apparatus according to claim 4 further comprising an insert, wherein the seal is frictionally fit in the constraint by the insert.

6. The apparatus according to claim 1, wherein the substantially non porous sheet material is one of a transparent material, an infrared reflective material, a low emissivity material, a semi-transparent material, a translucent material, or an opaque material.

7. The apparatus according to claim 1, wherein the seal forms an open arc that contacts the window pane near the perimeter area of the window pane.

8. The apparatus according to claim 1, wherein an opening is formed between seals attached along adjacent edges and the constraint is configured to close the opening.

9. The apparatus according to claim 1, wherein the seal contacts the windowpane.

10. The apparatus according to claim 1, wherein the constraint comprises a first portion substantially parallel to the windowpane and a second portion substantially perpendicular to the windowpane.

11. The apparatus according to claim 10, wherein the constraint further comprises a third portion substantially parallel to the windowpane.

12. The apparatus according to claim 1, wherein seals attached along two adjacent edges fit into the constraint.

13. The apparatus according to claim 1, wherein the seal extends from each of the edges of the substantially non porous sheet material and contacts an inward facing surface of the sash or the frame when the supplemental window apparatus is mounted to the window pane.

* * * * *